(12) United States Patent
Kreitzer et al.

(10) Patent No.: US 10,776,892 B2
(45) Date of Patent: Sep. 15, 2020

(54) DEVICE, SYSTEM AND METHOD FOR SCREENING OF PERSONALLY IDENTIFIABLE INFORMATION

(71) Applicant: MOTOROLA SOLUTIONS, INC., Chicago, IL (US)

(72) Inventors: Stuart S. Kreitzer, Coral Springs, FL (US); Jesus F. Corretjer, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 339 days.

(21) Appl. No.: 15/846,478

(22) Filed: Dec. 19, 2017

(65) Prior Publication Data
US 2019/0188814 A1 Jun. 20, 2019

(51) Int. Cl.
| | | |
|---|---|---|
| *G06Q 10/10* | (2012.01) | |
| *G06Q 30/02* | (2012.01) | |
| *G06Q 10/08* | (2012.01) | |
| *G06Q 40/08* | (2012.01) | |
| *G06Q 50/26* | (2012.01) | |
| *G06F 21/62* | (2013.01) | |
| *H04W 12/02* | (2009.01) | |

(Continued)

(52) U.S. Cl.
CPC ....... *G06Q 50/265* (2013.01); *G06F 21/6245* (2013.01); *G06F 21/6254* (2013.01); *H04W 12/02* (2013.01); *B64C 39/024* (2013.01); *B64C 2201/127* (2013.01); *G06F 2221/0748* (2013.01); *G06Q 50/01* (2013.01)

(58) Field of Classification Search
CPC .. G06Q 50/01; G06Q 50/265; G06F 21/6245; G06F 21/6254; G06F 2221/0748; H04W 12/02; B65C 2201/127; B64C 39/024

USPC .......................................... 705/1.1–912, 325
See application file for complete search history.

(56) References Cited

U.S. PATENT DOCUMENTS

| | | |
|---|---|---|
| 7,069,427 B2 | 7/2006 | Adler et al. |
| 7,711,749 B2 * | 5/2010 | Brodie .................. G06F 16/367 707/783 |
| 7,797,726 B2 | 9/2010 | Ashley et al. |

(Continued)

OTHER PUBLICATIONS

ISA/EP, International Search Report and Written Opinion, dated Feb. 11, 2019, re PCT International Patent Application No. PCT/US2018/064862.

(Continued)

*Primary Examiner* — Johnathan P Ouellette
(74) *Attorney, Agent, or Firm* — Perry + Currier, Inc.

(57) ABSTRACT

A device, system and method for screening of personally identifiable information is provided. An incident type of a particular incident is determined. Responsive to determining that potential evidence associated with the particular incident includes personally identifiable information, the potential evidence being of a particular evidence type including one or more of media and metadata generated by a user or a device associated with the user, a personally identifiable information processing mode is selected to process the potential evidence as a function of the incident type of the particular incident and an evidence type of the potential evidence. When selected mode is a storing mode, a record of the potential evidence is generated that included the personally identifiable information to be stored in an electronic storage device.

20 Claims, 22 Drawing Sheets

(51) Int. Cl.
*B64C 39/02* (2006.01)
*G06Q 50/00* (2012.01)

(56) References Cited

U.S. PATENT DOCUMENTS

| | | | |
|---|---|---|---|
| 7,853,786 B1 | 12/2010 | Fultz et al. | |
| 8,898,793 B2 | 11/2014 | Miettinen et al. | |
| 8,930,044 B1 * | 1/2015 | Peeters | B64C 19/00 701/2 |
| 9,082,018 B1 * | 7/2015 | Laska | H04N 21/431 |
| 9,129,460 B2 | 9/2015 | McClellan et al. | |
| 9,253,452 B2 * | 2/2016 | Ross | G11B 27/11 |
| 9,288,184 B1 | 3/2016 | Kvamme et al. | |
| 9,301,119 B2 | 3/2016 | Alazraki et al. | |
| 9,386,050 B2 | 7/2016 | Oswald | |
| 9,467,664 B2 | 10/2016 | Blanco et al. | |
| 10,284,885 B1 * | 5/2019 | Borras | H04N 21/23418 |
| 2010/0042583 A1 | 2/2010 | Gervais et al. | |
| 2013/0212692 A1 | 8/2013 | Sher-Jan et al. | |
| 2016/0196445 A1 | 7/2016 | Allen et al. | |
| 2016/0284038 A1 * | 9/2016 | Johnson | G06Q 50/265 |
| 2017/0061153 A1 | 3/2017 | Gordon et al. | |
| 2017/0111769 A1 | 4/2017 | Lin et al. | |
| 2017/0127274 A1 | 5/2017 | Lin et al. | |
| 2019/0013934 A1 * | 1/2019 | Mercuri | G06F 16/212 |
| 2019/0082305 A1 * | 3/2019 | Proctor | H04W 4/10 |
| 2019/0165949 A1 * | 5/2019 | Ramos | H04L 9/0637 |

OTHER PUBLICATIONS

Yus, Roberto, et al. "Faceblock: Privacy-aware pictures for google glass." UMBC Student Collection (2014).

Data Loss Prevention Platform—Discover and Protect All Sensitive Data—https://www.spirion.com/platform/—published Dec. 15, 2017.

* cited by examiner

| EVIDENCE TYPE | PII? |
|---|---|
| "CAMERA IMAGE(HUMAN FACE)" | TRUE |
| CAMERA IMAGE (INANIMATE OBJECT) | FALSE |
| IP/MAC ADDRESS OF PERSON'S DEVICES | TRUE |
| RESPONDER'S WEARABLE DEVICE DATA | TRUE |
| SOCIAL NETWORK DATA ASSOCIATED WITH INCIDENT LOCATION | TRUE |
| IOT DEVICE DATA OF PERSON'S DEVICES | TRUE |
| INFRARED IMAGES(DRONE) | TRUE |
| IOT DEVICE DATA (EXPLOSIVE DETECTOR) | FALSE |

| PII EVIDENCE TYPE | INCIDENT TYPE | | | | |
|---|---|---|---|---|---|
| | TRAFFIC STOP MINOR | TRAFFIC STOP DUI | ROBBERY | DOMESTIC BATTERY | HOMICIDE |
| CAMERA IMAGE (HUMAN FACE) | STORE | STORE | STORE | STORE | STORE |
| IP/MAC ADDRESS OF PERSON'S DEVICES | DISCARD | STORE | STORE | STORE | STORE |
| RESPONDER'S WEARABLE DEVICE DATA | STORE | STORE | STORE | STORE | STORE |
| SOCIAL NETWORK DATA ASSOCIATED WITH INCIDENT LOCATION | DISCARD | STORE | STORE | STORE | STORE |
| IOT DEVICE DATA OF PERSON'S DEVICES | DISCARD | STORE | STORE | STORE | STORE |
| INFRARED IMAGES (DRONE) | DISCARD | DISCARD | DISCARD | DISCARD | STORE |

| PII EVIDENCE TYPE | INCIDENT TYPE | | | | |
|---|---|---|---|---|---|
| | TRAFFIC STOP MINOR | TRAFFIC STOP DUI | ROBBERY | DOMESTIC BATTERY | HOMICIDE |
| CAMERA IMAGE (HUMAN FACE) | STORE | STORE | STORE | STORE | STORE |
| IP/MAC ADDRESS OF PERSON'S DEVICES | ENCRYPT AND DISCARD | STORE | STORE | STORE | STORE |
| RESPONDER'S WEARABLE DEVICE DATA | STORE | STORE | STORE | STORE | STORE |
| SOCIAL NETWORK DATA ASSOCIATED WITH INCIDENT LOCATION | TRANSMIT | STORE | STORE | STORE | STORE |
| IOT DEVICE DATA OF PERSON'S DEVICES | DISCARD | ENCRYPT AND STORE | STORE | STORE | STORE |
| INFRARED IMAGES (DRONE) | ALTER (BLUR FACES) AND DISCARD | ALTER (BLUR FACES) AND DISCARD | DISCARD | DISCARD | STORE |

| PII EVIDENCE TYPE | INCIDENT TYPE | | | | |
|---|---|---|---|---|---|
| | TRAFFIC STOP MINOR | TRAFFIC STOP DUI | ROBBERY | DOMESTIC BATTERY | HOMICIDE |
| CAMERA IMAGE (HUMAN FACE) | >0.7: STORE ≤0.7: ALTER ENCRYPT AND STORE | >0.6: STORE ≤0.6: ALTER AND STORE | STORE | >0.5: STORE ≤0.5: ALTER AND STORE | STORE |
| IP/MAC ADDRESS OF PERSON'S DEVICES | >0.9: STORE ≤0.9: ENCRYPT AND STORE | >0.7: STORE ≤0.7: ENCRYPT AND STORE | >0.5: STORE ≤0.5: ENCRYPT AND STORE | >0.7: STORE ≤0.7: ENCRYPT AND STORE | STORE |
| RESPONDER'S WEARABLE DEVICE DATA | STORE | STORE | STORE | >0.7: STORE ≤0.7: DISCARD | STORE |
| SOCIAL NETWORK DATA ASSOCIATED WITH INCIDENT LOCATION | TRANSMIT | STORE | STORE | >0.7: STORE ≤0.7: DISCARD | STORE |
| IOT DEVICE DATA OF PERSON'S DEVICES | >0.5: STORE >0.3 AND ≤0.5: DISCARD ≤0.3: ALTER, ENCRYPT AND DISCARD | >0.7: STORE ≤0.7: ENCRYPT AND STORE | STORE | >0.7: STORE ≤0.7: DISCARD | STORE |
| INFRARED IMAGES (DRONE) | ALTER (BLUR FACES) AND DISCARD | >0.8: STORE ≤0.8: ALTER ENCRYPT AND STORE | >0.5: STORE ≤0.5: ALTER AND STORE | >0.3: STORE ≤0.3: ALTER AND STORE | STORE |

FIG. 22

DEVICE, SYSTEM AND METHOD FOR SCREENING OF PERSONALLY IDENTIFIABLE INFORMATION

BACKGROUND OF THE INVENTION

Personally identifiable information (PII) is data that could potentially identify a specific individual and can include names, social security numbers, race, ethnicity, IP/MAC addresses, photo/video images (especially photo/video images that include a face), vehicle license plate numbers, locations, biometric data, social media data, and the like. Public safety organizations must safeguard how personally identifiable information is processed and/or stored as evidence to address risks, legal responsibilities and/or privacy concerns and/or privacy legislation. Non-compliance can be severe, and may include very high fines. Generally sorting through the evidence to identify personally identifiable information is time consuming and may require large processing overhead.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 6 depicts an example of rules for assisting with identifying evidence as personally identifiable information in accordance with some embodiments.

FIG. 9 depicts an example of a first mapping for assisting with determining whether personally identifiable information is to be stored according to an incident type in accordance with some embodiments.

FIG. 20 depicts an example of a first mapping for assisting with selecting a personally identifiable information processing mode according to an incident type in accordance with some embodiments.

FIG. 22 depicts an example of a third mapping for for assisting with selecting a personally identifiable information processing mode according to both an incident type and a person-of-interest score in accordance with some embodiments.

Figure 1:
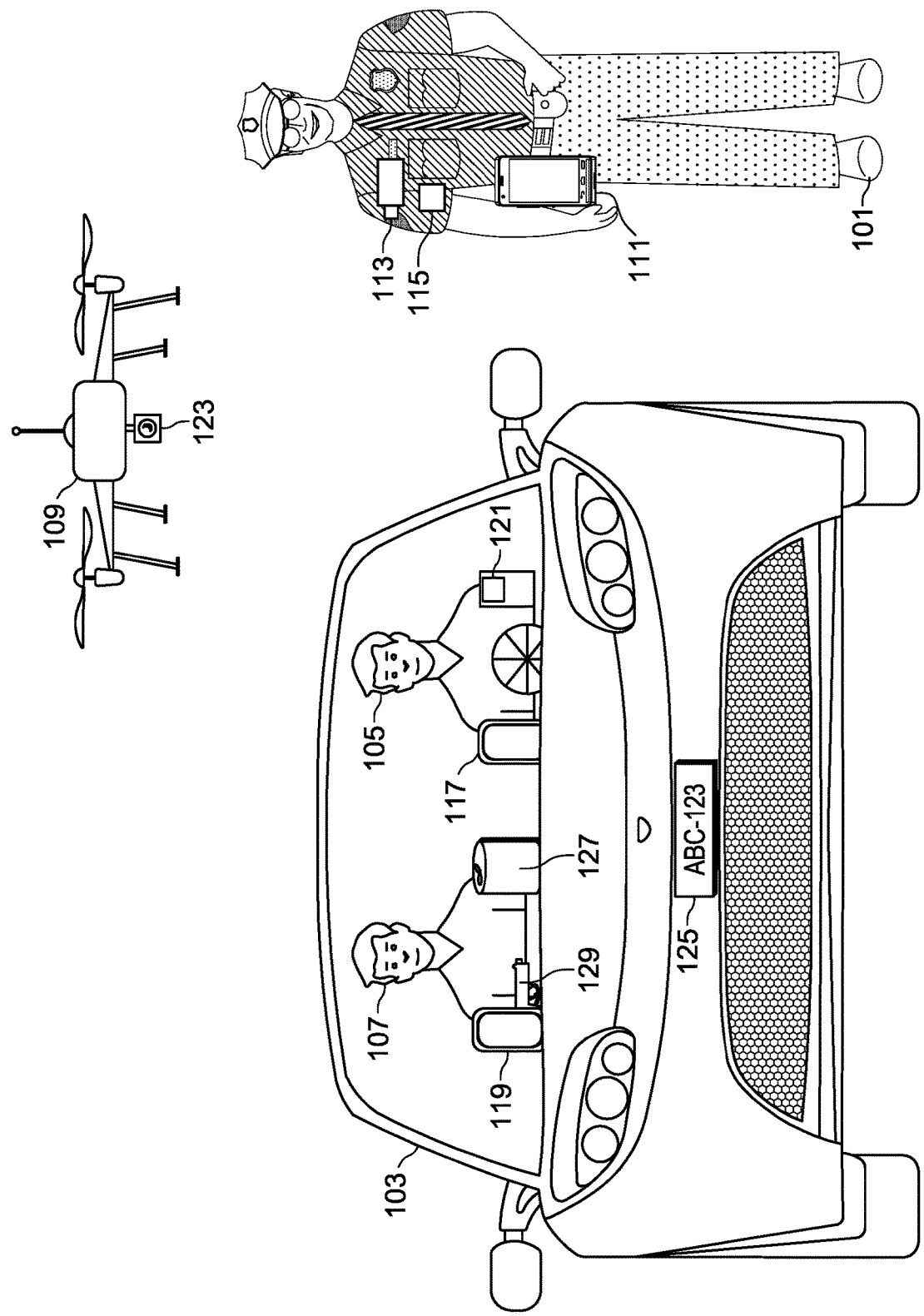
FIG. 1 is an incident scene in which personally identifiable information is collected in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device for collecting and storing evidence containing personally identifiable information, the device comprising: a controller and a communication interface, the controller having access to a memory storing a personally identifiable information rule collection database, the controller configured to: determine an incident type of a particular incident; determine whether potential evidence associated with the particular incident includes personally identifiable information, the potential evidence being of a particular evidence type including one or more of media and metadata generated by a user or a device associated with the user; responsive to determining that the potential evidence includes personally identifiable information: determine, using the personally identifiable information rule collection database, as a function of the incident type of the particular incident and an evidence type of the potential evidence, a personally identifiable information processing mode for processing the potential evidence, the personally identifiable information processing mode selected from a plurality of personally identifiable information processing modes; and when the personally identifiable information processing mode that is selected is a processing mode for storing the potential evidence, generate, at the controller, a record of the potential evidence including the personally identifiable information to be stored in an electronic storage device.

Another aspect of the specification provides a device for collecting and storing evidence containing personally identifiable information, the device comprising: a controller, a communication interface, the controller having access to a memory storing a personally identifiable information rule collection database, the controller configured to: determine an incident type of a particular incident; determine whether potential evidence associated with the particular incident includes personally identifiable information, the potential evidence being of a particular evidence type including one or more of media and metadata generated by a user or a device associated with the user; responsive to determining that the potential evidence includes personally identifiable information: determine, using the personally identifiable information rule collection database, as a function of the incident type of the particular incident and an evidence type of the potential evidence, whether the potential evidence should be stored or discarded; and when it is determined that the potential evidence is to be stored, generate, at the controller, a record of the potential evidence including the personally identifiable information to be stored in an electronic storage device.

A further aspect of the specification provides a method for collecting and storing evidence containing personally identifiable information, the method comprising: determining, at a controller of an evidence storage rules computing device, an incident type of a particular incident; determining, at the controller, whether potential evidence associated with the particular incident includes personally identifiable information, the potential evidence being of a particular evidence type including one or more of media and metadata generated by a user or a device associated with the user; responsive to determining that the potential evidence includes personally identifiable information: determining, at the controller, as a function of the incident type of the particular incident and an evidence type of the potential evidence, whether the potential evidence should be stored or discarded; and when it is determined that the potential evidence is to be stored, generating, at the controller, a record of the potential evidence including the personally identifiable information to be stored in an electronic storage device.

Attention is directed to FIG. 1, which depicts an incident scene 100 in which a responder 101, such as a police officer, has stopped a vehicle 103 with two persons including a driver 105 and a passenger 107. As depicted, the responder 101 is assisted by an airborne drone 109. The responder 101 may have been dispatched to the incident scene 100 by a computer aided dispatch, and the like, for example, when an incident was reported at the incident scene 100 via a 911 call and the like. A dispatch command may have been transmitted to a communication device 111 of the responder 101, which included a dispatch call classification, such as a minor traffic stop, and the like. Alternatively, the responder 101 may have pulled over the vehicle 103 as part of a minor traffic stop.

Furthermore, the incident scene 100 includes various evidence source devices including, but not limited to, the communication device 111 of the responder 101, a body-worn camera 113 (which may include, but is not limited to, an infrared camera) of the responder 101, at least one wearable device 115 of the responder 101 (e.g. a gas sensor, an explosive detector, a biometric sensor, a combination thereof, and the like, that may be configured to operate according to an Internet-Of-Things (IoT) protocol), a communication device 111 of the driver 105, a communication device 119 of the passenger 107, a wearable device 121 worn by the driver 105 (e.g. a biometric monitor, heart rate monitor, and the like, that may be configured to operate according to an IoT protocol), and a camera 123 (which may include, but is not limited to, an infrared camera) of the drone 109.

The device 111, the camera 113 and the at least one wearable device 115 of the responder 101 may form a personal area network (PAN) of the responder 101. In some embodiments, the device 111 may be in communication with the drone 109. In yet further embodiments, the device 111 may be implementing a virtual assistant, and the like, configured to assist the responder 101 with incidents, the virtual assistant having access to video and/or audio and/or data from the device 111, the camera 113, the camera 123, the at least one wearable device 115, and the like.

The various evidence source devices generally collect electronic potential evidence that may be used in a legal proceeding, and the like, that may result from the incident at the incident scene 100.

Generally, such electronic potential evidence includes media and metadata generated by a user (e.g. the responder 101, the driver 105, the passenger 107) or a device associated with a user (e.g. the devices 111, 117, 119, the cameras 113, 123, the at least one wearable device 115, and the wearable device 121).

Media evidence may include, but is not limited to, images, video and/or audio (including, but not limited to a live camera feed, and/or a live audio feed) acquired by one or more of the devices 111, 117, 119, and the cameras 113, 123, data from the at least one wearable device 115, and data from the wearable device 121. The media evidence may further include, but is not limited to, social network data associated with the devices 117, 119 and/or a location of the incident scene 100. For example, the social network data may include data posted on social media by the devices 117, 119 and/or the driver 105 and/or the passenger 107 that may or may not be associated with the incident at the incident scene 100, but may be posted on a social media site by the driver 105 and/or the passenger 107 and/or by persons in the vicinity of the incident scene 100.

Metadata evidence may include, but is not limited to, internet protocol (IP) addresses and/or media access control (MAC) addresses of the devices 117, 119 and/or the wearable device 121, and/or data packets generated by the devices 117, 119 and/or the wearable device 121.

Generally, the media evidence and/or the metadata evidence may include personally identifiable information, such as a face of the driver 105 and/or the passenger in images and/or video, a number of a license plate 125 of the vehicle 103, and the like. Similarly, the metadata evidence may include personally identifiable information, such as the IP and/or MAC addresses of the devices 117, 119 and/or the wearable device 121, which may be detected by, and/or collected by, the device 111, for example using a WiFi connection, a Bluetooth™ connection, and the like, with one or more of the devices 117, 119.

Furthermore, the incident scene 100 may include evidence that may not be personally identifiable information, but which may be used to determine an incident type of an incident at the incident scene 100. For example, as depicted, there is an open can 127 in the vehicle 103. When the open can 127 contains soda and/or a non-alcoholic beverage, the incident type may be a minor traffic stop; whereas when the open can 127 contains an alcoholic beverage, the incident type may be a driving-under-the-influence (DUI) traffic stop. When the type of beverage in the can 127 is initially determined to be non-alcoholic, and later determined to be alcoholic, the incident type may be escalated from a minor traffic stop to a DUI traffic stop.

Similarly, as depicted there is an object 129 in the vehicle 103. The object 129 may not be immediately identifiable in images, and the like, and may initially be determined to be another communication device, and the like, but may later be determined to be a gun and/or a weapon. As such, the incident type may be further escalated to a possession of a gun and/or when the driver 105 and/or the passenger 107 are determined to be associated with another incident, such as robbery or a homicide (e.g. where the weapon may have been used in the robbery or the homicide), the incident type maybe further escalated.

In any event, as will be explained in further detail below, a determination should be made as to whether the electronic potential evidence collected at the incident scene 100 is personally identifiable information, or not, and whether the electronic potential evidence is to be discarded or stored accordingly.

Figure 2:
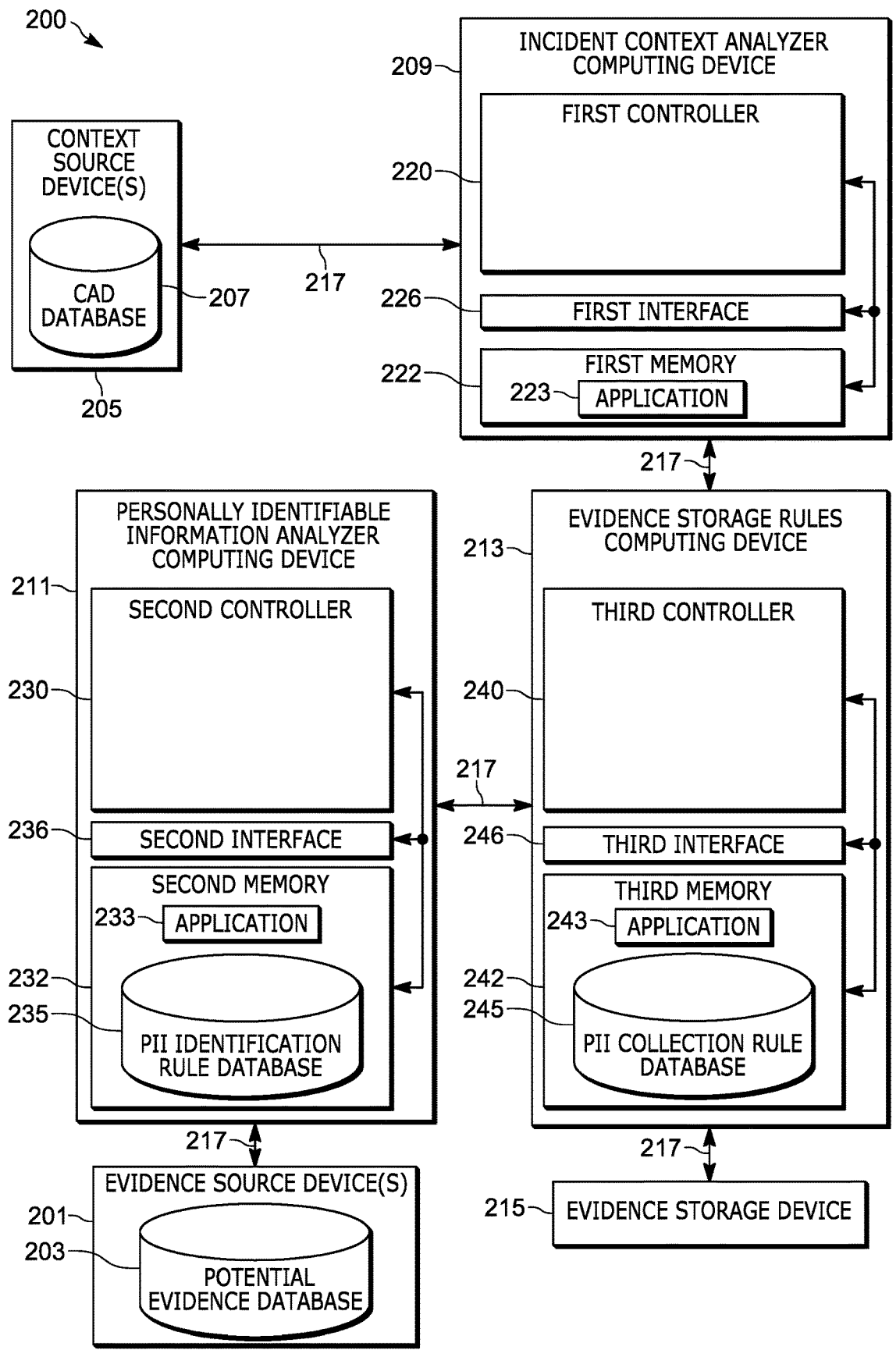
FIG. 2 is a schematic block diagram of a system for screening of personally identifiable information in accordance with some embodiments.

Attention is next directed to FIG. 2 which depicts a block diagram of a system 200 for screening of personally identifiable information.

As depicted, the system 200 comprises one or more evidence source devices 201, which may include, but is not limited to, the devices 111, 117, 119, the cameras 113, 123, at least one wearable device 115, and the wearable device 121, and/or a potential evidence database 203 that includes the electronic potential evidence associated with the incident scene 100. The potential evidence database 203 may comprise a memory (e.g. as stored at a potential evidence storage device and/or computing device), and the like, where the potential evidence collected at the incident scene 100 (and other incident scenes), as described above, is stored until a determination is made as to whether the potential evidence stored at the potential evidence database 203 is personally identifiable information, or not, and whether the electronic potential evidence is to be discarded or stored accordingly.

The system 200 further comprises one or more context source devices 205, which may include, but is not limited to, the devices 111, 117, 119, the cameras 113, 123, and at least one wearable device 115, and the wearable device 121, a computer aided dispatch (CAD) server and/or a computer aided dispatch database 207 that includes the context data associated with the incident scene 100. The computer aided dispatch database 207 may comprise a memory, and the like, where the context data associated with the incident scene 100 (and other incident scenes) is stored to assist with a determination of one or more of: a jurisdiction of the incident scene 100; an incident type of the incident at the incident scene 100; and a person of interest (POI) likelihood score for persons at the incident scene 100, such as the driver 105 and the passenger 107.

For example, the context data stored at the computer aided dispatch database 207 may include, but is not limited to, an incident report (e.g. generated in association with the incident at the incident scene 100), identifiers of persons associated with the incident at the incident scene 100 (e.g. such as the driver 105 and the passenger 107), a dispatch call classification (e.g. an initial classification of the incident type at the incident scene 100 used to dispatch the responder 101), a location of where the potential evidence was collected (e.g. a location of the incident scene 100), a location of where the physical evidence is to be stored, data from a virtual assistant of the device 111 of the responder 101, video and/or images and/or audio from a live camera feed and/or live audio feed (e.g. from the device 111 and/or the cameras 113, 123), data from the at least one wearable device 115, and the like.

It is assumed hereafter that the potential evidence and the context data stored in the databases 203, 207 are associated with the incident at the incident scene 100, though each of the databases 203, 207 may store data associated with a plurality of incidents associated, for example, via incident identifiers, and the like, with each incident identifier associated with a particular incident.

In some embodiments, the potential evidence database 203 may be combined with the CAD database 207 and may be located, for example, at a memory of a computer aided dispatch computing device. Either way, it is understood that each of the potential evidence database 203 are stored at a memory of a computing device, and are accessible to other components of the system 200.

For example, as depicted, the system 200 further comprises an incident context analyzer computing device 209, a personally identifiable information (PII) analyzer computing device 211, an evidence storage rules computing device 213, and an evidence storage device 215. The components of the system 200 are generally configured to communicate with each other via communication links 217, which may include wired and/or wireless links (e.g. cables, communication networks, the Internet, and the like) as desired. Furthermore, the components of the system 200 may be co-located and/or remote from each other as desired. Indeed, in some embodiments, subsets of the components of the system 200 may be combined to share processing and/or memory resources; in these embodiments, links 217 between combined components are eliminated and/or not present.

The incident context analyzer computing device 209 comprises a first controller 220, a first memory 222 storing a first application 223, and a first communication interface 226. The first controller 220, the first memory 222, the first application 223, and the first communication interface 226 will be interchangeably referred to hereafter, respectively, as the controller 220, the memory 222, the application 223, and the interface 226.

The PII analyzer computing device 211 comprises a second controller 230, a second memory 232 storing a second application 233 and a PII identification rule database 235 (which may be a component of the second application 233), and a second communication interface 236. The second controller 230, the second memory 232, the second application 233 and the second communication interface 236 will be interchangeably referred to hereafter, respectively, as the controller 230, the memory 232, the application 233 and the interface 236.

The evidence rules storage computing device 213 comprises a third controller 240, a third memory 242 storing a third application 243 and a PII collection rule database 245 (which may be a component of the third application 243), and a third communication interface 246. The third controller 240, the third memory 242, the third application 243 and the third communication interface 246 will be interchangeably referred to hereafter, respectively, as the controller 240, the memory 242, the application 243 and the interface 246.

Indeed, the computing devices 209, 211, 213 may include one or more servers, and the like, configured to determine whether electronic potential evidence collected at the incident scene 100 is personally identifiable information, or not, and whether the electronic potential evidence is to be discarded or stored accordingly. Furthermore, one or more of the computing devices 209, 211, 213 may include one or more respective input devices and/or one or more respective display devices and/or one or more speakers and/or one or more notification devices.

Attention is next directed to the incident context analyzer computing device 209 which is configured to determine a context of the incident of the incident scene 100 based on data from the one or more context source devices 205, which is received at the incident context analyzer computing device 209 via a respective link 217 therebetween, for example when requested by the incident context analyzer computing device 209.

The controller 220 includes one or more logic circuits configured to implement functionality for determining a context of an incident scene. Example logic circuits include one or more processors, one or more electronic processors, one or more microprocessors, one or more ASIC (application-specific integrated circuits) and one or more FPGA (field-programmable gate arrays). In some embodiments, the controller 220 and/or the incident context analyzer computing device 209 is not a generic controller and/or a generic computing device, but a computing device specifically configured to implement functionality for determining a context of an incident scene. For example, in some embodiments, the incident context analyzer computing device 209 and/or the controller 220 specifically comprises a computer executable engine configured to implement specific functionality for determining a context of an incident scene.

The memory 222 of the incident context analyzer computing device 209 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the incident context analyzer computing device 209 as described herein are maintained, persistently, at the memory 222 and used by the controller 220 which makes appropriate utilization of volatile storage during the execution of such programming instructions.

For example, the memory 222 of the incident context analyzer computing device 209 stores instructions corresponding to the application 223 that, when executed by the controller 220, enables the controller 220 to: retrieve and/or receive context data from the one or more context source devices 205; determine context data that defines a context of the incident at the incident scene 100 including, but not limited to, one or more of: a jurisdiction of the incident scene 100; an incident type of the incident at the incident scene 100; and a person of interest (POI) likelihood score for persons at the incident scene 100, such as the driver 105 and the passenger 107; and provide the context data to the evidence storage rules computing device 213. Hence, the controller 220 may be further configured to determine identifiers of persons associated with the incident scene 100 (e.g. from an incident report), for example, the driver 105 and the passenger 107, and determine a person-of-interest score for each of the persons.

The interface 226 is generally configured to communicate with the devices 205, 213, using respective links 217 which are wired and/or wireless as desired. The interface 226 may implemented by, for example, one or more cables, one or more radios and/or connectors and/or network adaptors, configured to communicate wired and/or wirelessly, with network architecture that is used to implement the communication links 217.

The interface 226 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications.

In yet further embodiments, the interface 226 may include one or more local area network or personal area network transceivers operating in accordance with an IEEE 802.11 standard (e.g., 802.11a, 802.11b, 802.11g), or a Bluetooth transceiver which may be used to communicate to implement the communication links 217.

However, in other embodiments, the interface 226 communicates over the links 217 using other servers and/or communication devices and/or network infrastructure devices, for example by communicating with the other servers and/or communication devices and/or network infrastructure devices using, for example, packet-based and/or internet protocol communications, and the like. In other words, the links 217 may include other servers and/or communication devices and/or network infrastructure devices, other than the depicted components of the system 200.

In any event, it should be understood that a wide variety of configurations for the incident context analyzer computing device 209 are within the scope of present embodiments.

Attention is next directed to the PII analyzer computing device 211 which is configured to identify the potential evidence as personally identifiable information or as not being personally identifiable information, the potential evidence received from the one or more evidence source devices 201, which is received at the PII analyzer computing device 211 via a respective link 217 therebetween, for example when requested by the PII analyzer computing device 211.

The controller 230 includes one or more logic circuits configured to implement functionality for identifying the potential evidence as personally identifiable information or as not being personally identifiable information. Example logic circuits include one or more processors, one or more electronic processors, one or more microprocessors, one or more ASIC (application-specific integrated circuits) and one or more FPGA (field-programmable gate arrays). In some embodiments, the controller 230 and/or the PII analyzer computing device 211 is not a generic controller and/or a generic computing device, but a computing device specifically configured to implement functionality for identifying the potential evidence as personally identifiable information or as not being personally identifiable information. For example, in some embodiments, the PII analyzer computing device 211 and/or the controller 230 specifically comprises a computer executable engine configured to implement specific functionality for identifying the potential evidence as personally identifiable information or as not being personally identifiable information.

The memory 232 of the PII analyzer computing device 211 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the PII analyzer computing device 211 as described herein are maintained, persistently, at the memory 232 and used by the controller 230 which makes appropriate utilization of volatile storage during the execution of such programming instructions.

For example, the memory 232 of the PII analyzer computing device 211 stores instructions corresponding to the application 233 that, when executed by the controller 230, enables the controller 230 to: identify and/or classify each the potential evidence from the one or more evidence source devices 201 as personally identifiable information or as not personally identifiable information; and provide the identification and/or classification of the potential evidence to the evidence storage rules computing device 213. For example, the controller 220 may identify and/or classify each the potential evidence from the one or more evidence source devices 201 as personally identifiable information or as not personally identifiable information using the PII identification rule database 235, which may provide rules, and the like, for identifying and/or classifying potential evidence, as described in more detail below.

The controller 230 may be further configured to identify and/or classify each the potential evidence from the one or more evidence source devices 201 as personally identifiable information or as not personally identifiable information based, at least in part, on an evidence type of the potential evidence.

The controller 230 may be further configured to: retrieve and/or receive the potential evidence from the one or more evidence source devices 201, identify and/or classify the potential evidence as personally identifiable information or as not personally identifiable information; and provide the potential evidence, and the identification and/or classification of the potential evidence, to the evidence storage rules computing device 213.

The interface 236 is generally similar to the interface 226, though configured to communicate with the one or more evidence source devices 201 and the evidence storage rules computing device 213 via respective links 217.

In any event, it should be understood that a wide variety of configurations for the PII analyzer computing device 211 are within the scope of present embodiments.

Attention is next directed to the evidence storage rules computing device 213 which is configured for screening of personally identifiable information.

The evidence storage rules computing device 213 generally determines that the potential evidence includes personally identifiable information (e.g. based on an identification and/or a classification received from the PII analyzer computing device 211).

In some embodiments, the evidence storage rules computing device 213 further determines an incident type of the particular incident associated with the potential evidence, for example by receiving the incident type from the incident context analyzer computing device 209. When the potential evidence includes personally identifiable information, the evidence storage rules computing device 213 determines, as a function of an incident type of the particular incident associated with the potential evidence, and an evidence type of the potential evidence, whether the potential evidence should be stored or discarded. When the potential evidence, that includes the personally identifiable information, is to be stored, the evidence storage rules computing device 213 generates a record that includes the potential evidence and causes the record to be stored at the evidence storage device 215.

In further embodiments, the evidence storage rules computing device 213 further determines a person-of-interest score for each person of interest associated with the particular incident, for example by receiving the person-of-interest scores from the incident context analyzer computing device 209. When the potential evidence includes personally identifiable information, the evidence storage rules computing device 213 determines, whether the person-of-interest scores for persons associated with potential evidence, meet one or more threshold conditions for an evidence type of the potential evidence. When the person-of-interest scores meets the one or more threshold, the conditions, the evidence storage rules computing device 213 determines that the potential evidence is to be stored, generates a record that includes the potential evidence, and causes the record to be stored at the evidence storage device 215.

In some embodiments, the determination of whether to save or discard potential evidence is based on a combination of incident type and person-of-interest scores.

The controller 240 includes one or more logic circuits configured to implement functionality for screening of personally identifiable information. Example logic circuits include one or more processors, one or more electronic processors, one or more microprocessors, one or more ASIC (application-specific integrated circuits) and one or more FPGA (field-programmable gate arrays). In some embodiments, the controller 240 and/or the evidence storage rules computing device 213 is not a generic controller and/or a generic computing device, but a computing device specifically configured to implement functionality for screening of personally identifiable information. For example, in some embodiments, the evidence storage rules computing device 213 and/or the controller 240 specifically comprises a computer executable engine configured to implement specific functionality for screening of personally identifiable information.

The memory 242 of the evidence storage rules computing device 213 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the evidence storage rules computing device 213 as described herein are maintained, persistently, at the memory 242 and used by the controller 240 which makes appropriate utilization of volatile storage during the execution of such programming instructions.

For example, in some embodiments, the memory 242 of the evidence storage rules computing device 213 stores instructions corresponding to the application 243 that, when executed by the controller 240, enables the controller 240 to: receive potential evidence of a particular evidence type including one or more of media and metadata generated by a user or a device associated with the user, the potential evidence further associated with a particular incident; determine an incident type of the particular incident; determine whether the potential evidence includes personally identifiable information; responsive to determining that the potential evidence includes personally identifiable information: determine, at the controller, as a function of the incident type of the particular incident and an evidence type of the potential evidence, whether the potential evidence should be stored or discarded; and when it is determined that the potential evidence is to be stored, generate a record of the potential evidence including the personally identifiable information to be stored in the evidence storage device 215.

In yet further embodiments, the application 243, when executed by the controller 240, enables the controller 240 to: receive potential evidence of a particular evidence type including one or more of media and metadata generated by a user or a device associated with the user, the potential evidence further associated with a particular incident; determine a person-of-interest score for a person of interest associated with the potential evidence; determine whether the potential evidence includes personally identifiable information; responsive to determining that the potential evidence includes personally identifiable information: determine, at the controller, whether the person-of-interest score meets one or more threshold conditions for an evidence type of the potential evidence; and when the person-of-interest score meets one or more threshold conditions, generate a record of the potential evidence, including the personally identifiable information, to be stored in the evidence storage device 215.

In yet further embodiments, the application 243, when executed by the controller 220, enables the controller 220 to determine whether to store or discard the potential evidence that includes personally identifiable information based on both the incident type and the person-of-interest scores.

For example, rules for determining how to screen the potential evidence may be stored in the PII collection rule database 245, such rules defining whether potential evidence that includes personally identifiable information is to be stored or discarded.

Furthermore, such rules may be jurisdictional. For example, screening of potential evidence that includes personally identifiable information may depend on a jurisdiction where the potential evidence was collected and/or a jurisdiction where the potential evidence is stored and/or is to be stored. Indeed, a jurisdiction where the potential evidence was collected may be different from a jurisdiction where the potential evidence is to be stored; for example, the potential evidence may be collected in a first jurisdiction, but the potential evidence may be stored in a second jurisdiction with different privacy laws than the first jurisdiction. Hence, the PII collection rule database 245 may store a plurality of rules associated with respective jurisdictions, and the potential evidence may be screened according to a selected jurisdiction and/or a determined jurisdiction. Furthermore, the rules associated with respective jurisdictions may define whether to store or discard the potential evidence that includes personally identifiable information based on the incident type, the person-of-interest scores and/or a combination thereof.

Furthermore, one or more of the computing devices 209, 211, 213 may include one or more respective input devices which may be used to receive input that selects a jurisdiction, and which may be received at the evidence storage rules computing device 213. Alternatively, the jurisdiction may be received in context data from the incident context analyzer computing device 209.

However, in some embodiments, determination of a jurisdiction may be optional, for example when the system 200 is associated with a single jurisdiction and/or the PII collection rule database 245 stores only rules for a single jurisdiction.

The interface 246 is generally similar to the interface 226, though configured to communicate with the incident context analyzer computing device 209 and the PII analyzer computing device 211 via respective links 217.

In any event, it should be understood that a wide variety of configurations for the evidence storage rules computing device 213 are within the scope of present embodiments.

The evidence storage device 215 generally comprises a memory, and the like, for example at an evidence storage server, and the like, for storing evidence for use in a legal proceeding, and the like. As such, the evidence storage device 215 may be associated with the particular incident that occurred at the incident scene 100 and/or a jurisdiction associated with the particular incident that occurred at the incident scene 100.

Figure 3:
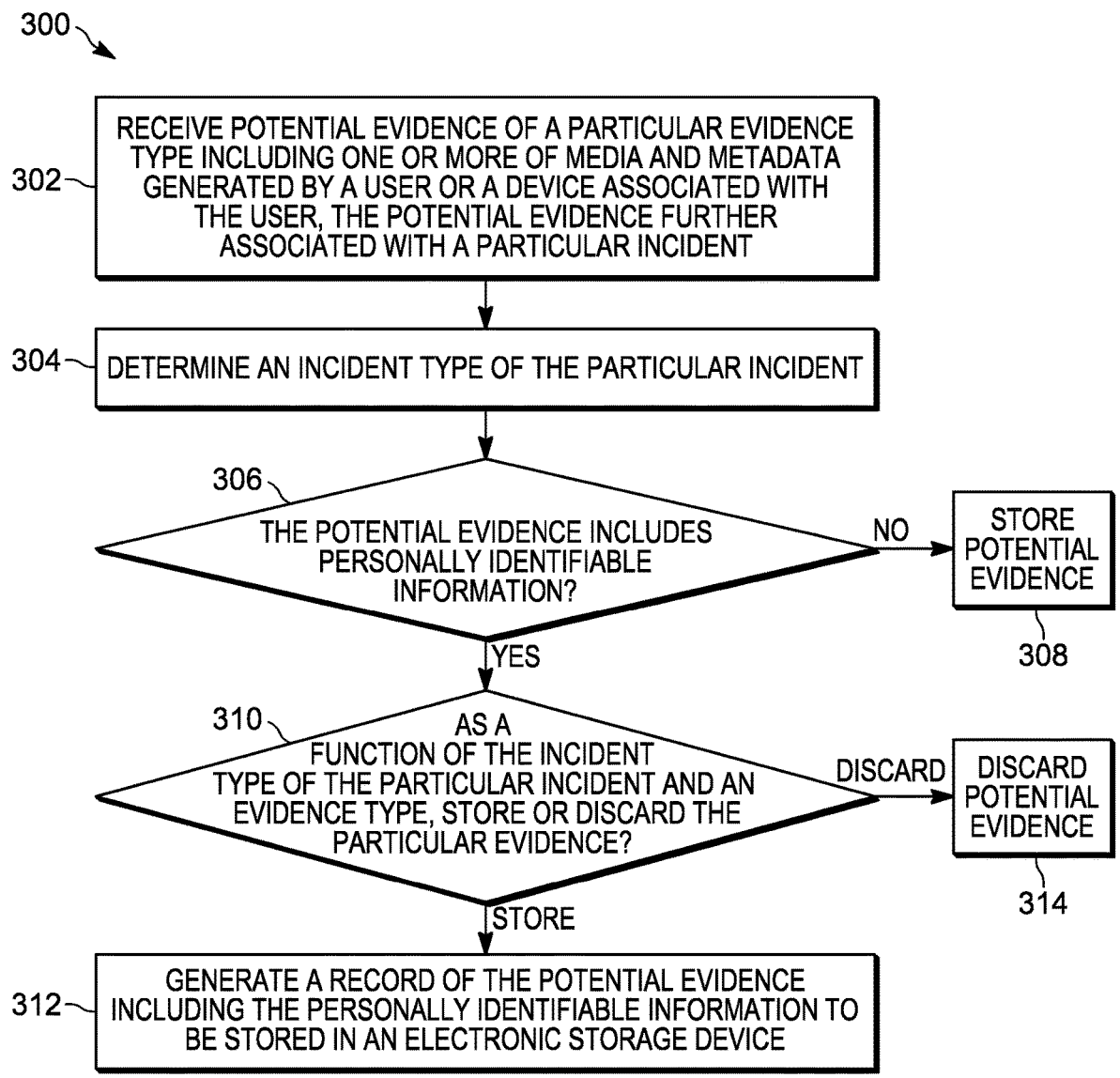
FIG. 3 is a flowchart of a method for screening of personally identifiable information according to incident type and evidence type in accordance with some embodiments.

Attention is now directed to FIG. 3 which depicts a flowchart representative of a method 300 for screening of personally identifiable information based on incident type. The operations of the method 300 of FIG. 3 correspond to machine readable instructions that are executed by, for example, the evidence storage rules computing device 213, and specifically by the controller 240 of the evidence storage rules computing device 213. In the illustrated example, the instructions represented by the blocks of FIG. 3 are stored at the memory 242, for example, as the application 243. The method 300 of FIG. 3 is one way in which the controller 240 and/or the evidence storage rules computing device 213 and/or the system 200 is configured. Furthermore, the following discussion of the method 300 of FIG. 3 will lead to a further understanding of the evidence storage rules computing device 213 and/or the system 200, and their various components. However, it is to be understood that the evidence storage rules computing device 213 and/or the method 300 and/or the system 200 may be varied, and need not work exactly as discussed herein in conjunction with each other, and that such variations are within the scope of present embodiments.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the evidence storage rules computing device 213 of FIG. 1, as well.

At a block 302, the controller 240 receives potential evidence of a particular evidence type including one or more of media and metadata generated by a user or a device associated with the user, the potential evidence further associated with a particular incident. For example, the potential evidence may be received from the PII analyzer computing device 211.

At a block 304, the controller 240 determines an incident type of the particular incident. For example, the incident type may be received from the incident context analyzer computing device 209.

At a block 306, the controller 240 determines whether the potential evidence includes personally identifiable information, for example based on identification data and/or classification data receive from the PII analyzer computing device 211

When the potential evidence does not include personally identifiable information (e.g. a "NO" decision at the block 306), at a block 308, the controller 240 causes the potential evidence to be stored, for example by generating a record that includes the potential evidence and/or by transmitting the potential evidence to the evidence storage device 215 for storage in the record.

However, when the potential evidence includes personally identifiable information (e.g. a "YES" decision at the block 306), at a block 310, the controller 240, responsive to determining that the potential evidence includes personally identifiable information, determines as a function of the incident type of the particular incident and an evidence type of the potential evidence, whether the potential evidence should be stored or discarded. Such a determination may be performed using the PII collection rule database 245.

When it is determined that the potential evidence is to be stored (e.g. a "STORE" decision at the block 310), at a block 312, the controller 240 generates a record of the potential evidence including the personally identifiable information to be stored in an electronic storage device, such as the evidence storage device 215.

However, when it is determined that the potential evidence is to be discarded (e.g. a "DISCARD" decision at the block 310), at a block 314, the controller 240 discards the potential evidence and/or refrains from generating a record of the potential evidence. In some embodiments, at the block 314, the controller 240 may generate another record indicative of the refraining; and/or transmit an indication of the refraining to the evidence storage device 215 for storage.

In some embodiments, the block 302 is optional in that the evidence storage rules computing device 213 and/or the controller 240 may not receive the potential evidence; rather the evidence storage rules computing device 213 and/or the controller 240 may receive an identifier of the potential evidence, which is associated with an identifier of the incident; such identifiers may be used to implement the method 300 without the evidence storage rules computing device 213 and/or the controller 240 receiving the potential evidence. In these embodiments, when it is determined that the potential evidence is to be stored (e.g. when implementing the block 308 and/or a "STORE" decision at the block 310), at the block 312, the controller 240 may transmit commands to other components of the system 200 that causes the other components to retrieve (e.g. using the identifiers) the potential evidence, as stored, for example, in the potential evidence database 203, and provide the potential evidence to the evidence storage device 215 for storage in a record. Alternatively, the potential evidence stored in the potential evidence database 203 may be tagged as personally identifiable information, or not, and/or discarded from the potential evidence database 203 based on the commands from the controller 240, that include the identifiers. In other words, the evidence storage device 215 may store the potential evidence database 203, and the potential evidence may be tagged as personally identifiable information, or not, and/or discarded accordingly based on the method 300.

Figure 4:
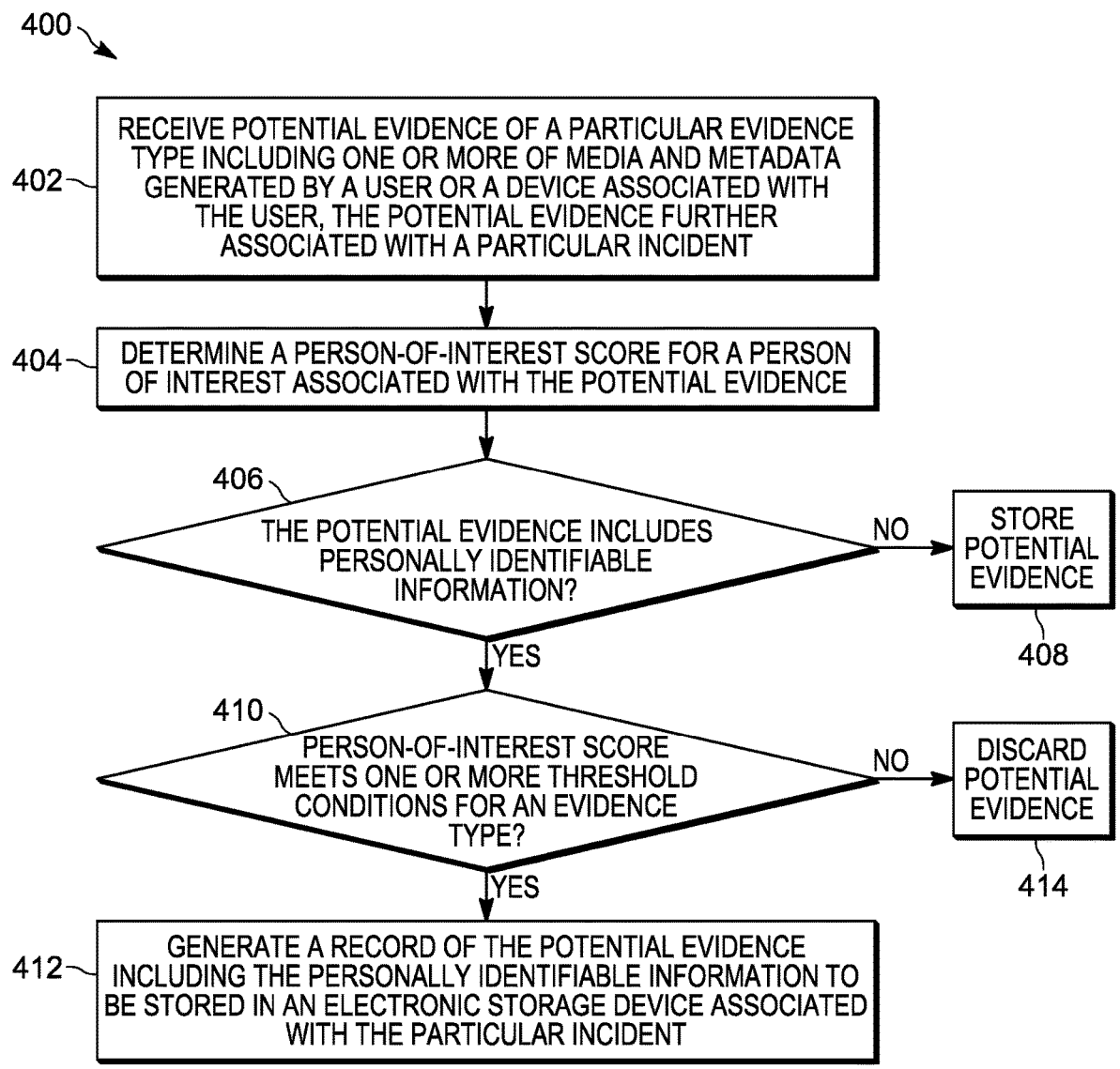
FIG. 4 is a flowchart of a method for screening of personally identifiable information according to a person-of-interest score in accordance with some embodiments.

Attention is now directed to FIG. 4 which depicts a flowchart representative of a method 400 for screening of personally identifiable information based on person-of-interest scores. The operations of the method 400 of FIG. 4 correspond to machine readable instructions that are executed by, for example, the evidence storage rules computing device 213, and specifically by the controller 240 of the evidence storage rules computing device 213. In the illustrated example, the instructions represented by the blocks of FIG. 4 are stored at the memory 242, for example, as the application 243. The method 400 of FIG. 4 is one way in which the controller 240 and/or the evidence storage rules computing device 213 and/or the system 200 is configured. Furthermore, the following discussion of the method 400 of FIG. 4 will lead to a further understanding of the evidence storage rules computing device 213 and/or the system 200, and their various components. However, it is to be understood that the evidence storage rules computing device 213 and/or the method 400 and/or the system 200 may be varied, and need not work exactly as discussed herein in conjunction with each other, and that such variations are within the scope of present embodiments.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the evidence storage rules computing device 213 of FIG. 1, as well.

At a block 402, the controller 240 receives potential evidence of a particular evidence type including one or more of media and metadata generated by a user or a device associated with the user, the potential evidence further associated with a particular incident. For example, the potential evidence may be received from the PII analyzer computing device 211. The block 402 is generally similar to the block 302 of the method 300.

At a block 404, the controller 240 determines a person-of-interest score for a person of interest associated with the potential evidence. For example, the person-of-interest score may be received from the incident context analyzer computing device 209. Furthermore, a person-of-interest score may be determined for each person associated with the potential evidence.

At a block 406, the controller 240 determines whether the potential evidence includes personally identifiable information, for example based on identification data and/or classification data received from the PII analyzer computing device 211. The block 406 is generally similar to the block 306 of the method 300.

When the potential evidence does not include personally identifiable information (e.g. a "NO" decision at the block 406), at a block 408, the controller 240 causes the potential evidence to be stored, for example by generating a record that includes the potential evidence and/or by transmitting the potential evidence to the evidence storage device 215 for storage in the record. The block 408 is generally similar to the block 308 of the method 300.

However, when the potential evidence includes personally identifiable information (e.g. a "YES" decision at the block 406), at a block 410, the controller 240, responsive to determining that the potential evidence includes personally identifiable information, determines whether the person-of-interest score meets one or more threshold conditions for an evidence type of the potential evidence. Such a determination may be performed using the PII collection rule database 245.

When it is determined that the person-of-interest score meets the one or more threshold conditions (e.g. a "YES" decision at the block 410), at a block 412, the controller 240 generates a record of the potential evidence including the personally identifiable information to be stored in an electronic storage device, such as the evidence storage device 215. The block 412 is generally similar to the block 312 of the method 300.

However, when it is determined that the person-of-interest score does not meet the one or more threshold conditions (e.g. a "NO" decision at the block 410), at a block 414, the controller 240 discards the potential evidence and/or refrains from generating a record of the potential evidence. In some embodiments, at the block 414, the controller 240 may generate another record indicative of the refraining; and/or transmit an indication of the refraining to the evidence storage device 215 for storage. The block 414 is generally similar to the block 314 of the method 300.

Similar to the block 302, in some embodiments, the block 402 is optional in that the evidence storage rules computing device 213 and/or the controller 240 may not receive the potential evidence; rather the evidence storage rules computing device 213 and/or the controller 240 may receive an identifier of the potential evidence, which is associated with an identifier of the incident; such identifiers may be used to implement the method 400 without the evidence storage rules computing device 213 and/or the controller 240 receiving the potential evidence. In these embodiments, when it is determined that the potential evidence is to be stored (e.g. when implementing the block 408 and/or a "YES" decision at the block 410), at the block 412, the controller 240 may transmit commands to other components of the system 200 that causes the other components to retrieve (e.g. using the identifiers) the potential evidence, as stored, for example, in the potential evidence database 203, and provide the potential evidence to the evidence storage device 215 for storage in a record. Alternatively, the potential evidence stored in the potential evidence database 203 may be tagged as personally identifiable information, or not, and/or discarded from the potential evidence database 203 based on the commands from the controller 240, that include the identifiers. In other words, the evidence storage device 215 may store the potential evidence database 203, and the potential evidence may be tagged as personally identifiable information, or not, and/or discarded accordingly based on the method 400.

Example embodiments of the method 300 and the method 400 will now be described with reference to FIG. 5 to FIG. 17. Indeed, the example embodiments will be described with respect to both the method 300 and the method 400 being implemented at the evidence storage rules computing device 213.

Figure 5:
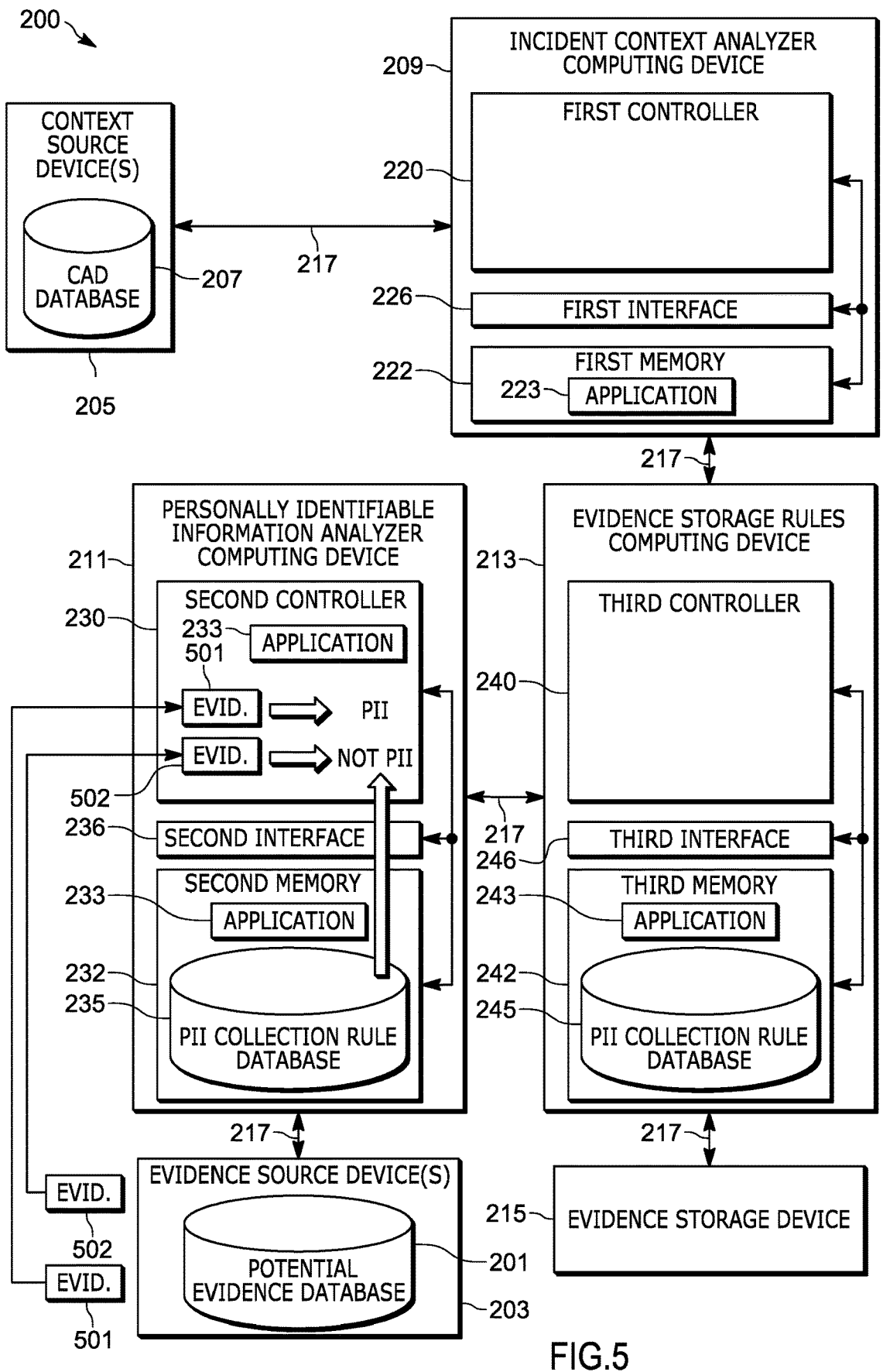
FIG. 5 depicts potential evidence being tagged, in the system of FIG. 2, as personally identifiable information or as not personally identifiable information in accordance with some embodiments.

Attention is next directed to FIG. 5, which is substantially similar to FIG. 2, with like elements having like numbers. In FIG. 5, the PII analyzer computing device 211 is executing the application 233 and is receiving potential evidence 501, 502 from the one or more evidence source devices 201. The potential evidence 501, 502 may be received with an incident identifier such that the computing devices 209, 211, 213 may coordinate analyzing of data for a particular incident. Furthermore, the potential evidence 501, 502 may be associated with one or more persons, for example the driver 105 and/or the passenger 107; indeed, the potential evidence 501, 502 may be tagged and/or associated with respective person identifiers indicating the one or more persons with which each of the potential evidence 501, 502 is associated.

Furthermore, the controller 230 is accessing the PII identification rule database 235 to determine whether each of the potential evidence 501, 502 is personally identifiable information or not personally identifiable information. In particular, each of the potential evidence 501, 502 is tagged with a value and/or an identifier, and the like, representing the probability of the potential evidence 501, 502 being personally identifiable information, for example based on rules, and the like, stored in the PII identification rule database 235.

For example, attention is directed to FIG. 6 which depicts an example embodiment of rules 635 stored in the PII identification rule database 235. In the depicted example, the rules 635 are organized as a table, though the rules 635 may be in any suitable format. Each rule 635 includes a classification of evidence type, one evidence type per row, with an associated Boolean value indicative of whether the associated evidence type may be classified as personally identifiable information (e.g. an associated Boolean value of "TRUE") or not classified as personally identifiable information (e.g. an associated Boolean value of "FALSE").

As depicted, the following evidence types of the rules 635 are likely to be personally identifiable information, and/or have a "high" probability of being personally identifiable information: camera images that include human faces, IP and/or MAC addresses of person's devices, device data from a responder's wearable device, social network data associated with an incident location, Internet-of-Things device data of person's wearable devices (and the like), and infrared images from auxiliary camera devices, such as from a drone. However, such a list is not meant to be exhaustive, and the rules 635 may include other evidence types that are likely to be personally identifiable information, such as camera images that include a license plate number (such as from the license plate 125), biometric data from a responder's wearable device and/or a person's wearable device, audio data, message data from a person's device, global positioning system data from a person's device and the like. In the depicted rules 635, it is assumed that a "person" is not a responder, but rather a potential suspect, and the like, in an incident, such as the driver 105 and the passenger 107.

As depicted, for the following evidence types of the rules 635 are likely to not be personally identifiable information and/or have a "low" probability of being personally identifiable information: camera images that include inanimate objects (e.g. other than a license plate number), Internet-of-Things device data of a responder's wearable devices, other than biometric data, for example data from an explosives sensor, a gas sensor, and the like. However, such a list is not meant to be exhaustive, and the rules 635 may include other evidence types that are likely to not be personally identifiable information, such as weather data, dates, times, and the like.

Returning, to FIG. 5, the controller 230 at the PII analyzer computing device 211 processes and/or analyzes the potential evidence 501, 502 to determine an evidence type of each, compares the evidence type to the rules 635, and tags each of the evidence 501, 502 based on the Boolean values associated with the evidence type of each of the potential evidence 501, 502. For example, when the potential evidence 501 comprises a camera image that includes a human face (e.g. a face of the driver 105 and/or the passenger 107), the controller 230 tags the potential evidence 501 as being personally identifiable information; similarly, when the potential evidence 502 comprises a camera image that includes an inanimate object (e.g. other than a license plate, such as the license plate 125), the controller 230 tags the potential evidence 501 as not being personally identifiable information.

Furthermore, the application 233 may include any suitable algorithm for identifying an evidence type of the potential evidence 501, 502 including, but not limited to, video and/or image and/or audio analytic algorithms for determining whether an image includes a human face, a license plate number, an inanimate object, and the like. In some embodiments, while in some embodiments the potential evidence 501, 502 may be received from the evidence source devices 201 with evidence type identifiers, in other embodiments, the controller 230 may determine an evidence type of the potential evidence 501, 502

Furthermore, the application 233 may include machine learning and/or deep-learning based algorithms, and the like, which have been trained and/or configured to identify evidence types of the potential evidence 501, 502 and/or to use the rules 635 to determine probabilities of the potential evidence 501, 502 being personally identifiable information, or not. Indeed, when the identification of the potential evidence 501, 502 as being personally identifiable information, or not, is probability based, a determined probability for each of the potential evidence 501, 502 may be compared to a threshold probability and/or a threshold condition. When the potential evidence 501, 502 meets the threshold probability and/or the threshold condition, the potential evidence 501, 502 may be determined to be personally identifiable information; and when the potential evidence 501, 502 does not meet the threshold probability and/or the threshold condition, the potential evidence 501, 502 may be determined to not be personally identifiable information. For example, when a respective probability of the potential evidence 501, 502 is above a 50% threshold probability, the potential evidence 501, 502 may be determined to be personally identifiable information, and otherwise the potential evidence 501, 502 is not personally identifiable information.

In some embodiments, the tagging of the potential evidence 501, 502 may include tagging the potential evidence 501, 502 with person identifiers of one or more persons (e.g. the driver 105 and/or the passenger 107) associated with the potential evidence 501, 502. For example, while the potential evidence 501, 502 may already be tagged with such person identifiers, as described above, the potential evidence 501, 502 may alternatively be tagged by the controller 230 executing the application 233. For example, the potential evidence 501, 502 may be received with images and/or identifier information (such as social media account identifiers, driver's license numbers, and the like) of persons associated with the particular incident with which the potential evidence 501, 502. The controller 230 may tag (and/or associate) the potential evidence 501, 502 by comparing the potential evidence 501, 502 with such images and/or identifier information of the persons.

Figure 7:
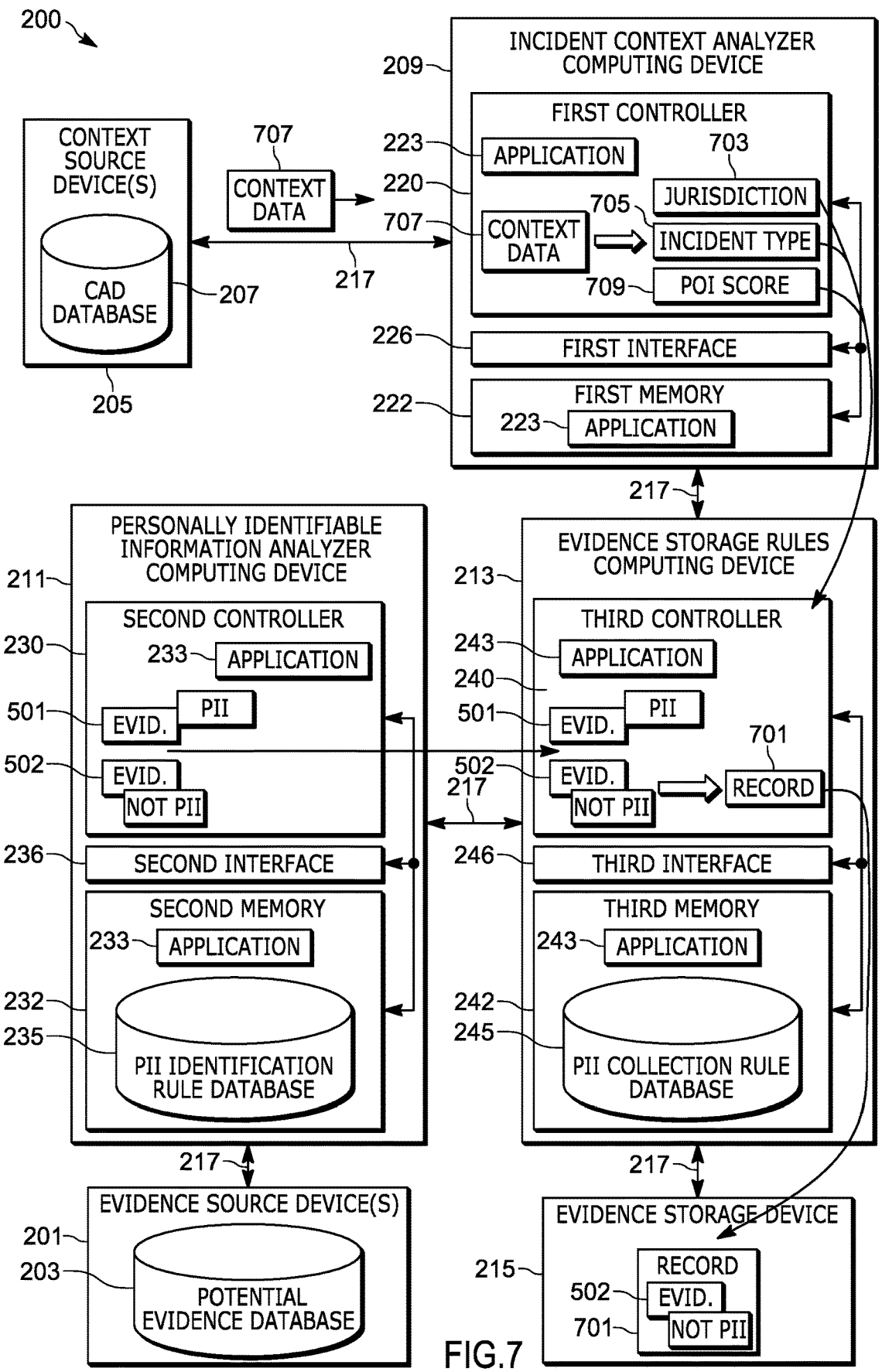
FIG. 7 depicts a computing device of the system of FIG. 2 storing potential evidence that does not include personally identifiable information in the system of FIG. 2 in accordance with some embodiments.

Attention is next directed to FIG. 7, which is substantially similar to FIG. 5, with like elements having like numbers. In particular, FIG. 7 depicts example embodiments of the blocks 302, 304, 306, 308 of the method 300 and/or the blocks 402, 404, 406, 408 of the method 400. It is assumed in FIG. 7 that the controller 240 of the evidence storage rules computing device 213 is executing the application 243, and that the incident context analyzer computing device 209 is executing the application 223.

As depicted, the evidence storage rules computing device 213 is receiving (e.g. at the block 302 of the method 300 and/or at the block 402 of the method 400) the potential evidence 501, 502 from the PII analyzing computing device 211, for example with an incident identifier, any person identifiers, and evidence types of the potential evidence 501, 502.

Furthermore, the potential evidence 501 has been tagged by the PII analyzing computing device 211 as being "PII", and the potential evidence 502 has been tagged by the PII analyzing computing device 211 as being "NOT PII", as described above. Such tags enable the controller 240 to implement the blocks 306, 308 of the method 300 and/or the blocks 406, 408 of the method 400; for example, the controller 240 may determine (e.g. at the block 306 and/or at the block 406) that the potential evidence 501, 502 is personally identifiable information, or not, by analyzing and/or processing the respective tags.

As the potential evidence 502 is not personally identifiable information, the controller 240 stores (e.g. at the block 308 and/or at the block 408) the potential evidence 502 by generating a record 701 that includes the potential evidence 502 and transmitting the record 701 for storage at the evidence storage device 215. The record 701 may further include data received from the incident context analyzer computing device 209 including, but not limited to, a jurisdiction 703 (either of where the incident occurred, or where the evidence for the incident is to be stored) and incident type 705 of an associated incident, as well as an incident identifier, and the like.

For example, attention is next directed to the incident context analyzer computing device 209 which is depicted as receiving context data 707 from the one or more context source devices 205 (e.g. with an incident identifier of the particular incident). The controller 220 of the incident context analyzer computing device 209 analyzes and/or processes the context data 707 to determine the jurisdiction 703 and the incident type 705. As depicted, the controller 220 further determines a person-of-interest score 709 for each person associated with the incident.

For example, the context data 707 may include an incident report that specifies the jurisdiction 703 and the incident type 705, and the controller 240 may extract the jurisdiction 703 and the incident type 705 from the incident report. Alternatively, the jurisdiction 703 and/or the incident type 705 may be extracted from other types of contextual data, such as location data, images and/or audio (e.g. that include visual and/or audio indicators of an incident type), and the like.

As depicted, the controller 220 further determines a person-of-interest score 709 for each person associated with an incident; the person-of-interest score 709 generally indicates a probability of a person being a person-of-interest (e.g. a suspect) or a bystander. As such, the person-of-interest score 709 may be a value between 0 and 1, with 1 being a highest probability that an associated person is a person of interest, and 0 being a lowest probability that an associated person is a person of interest.

Hence, the application 223 may include machine learning and/or deep-learning based algorithms which have been trained and/or configured to determine such person-of-interest scores. For example, such algorithms of the application 223 may include, but are not limited to: Natural Language Processing (NLP) of live and/or recorded conversations (e.g. from audio at the device 111 of the responder 101, and/or by a virtual assistant at the device 111 of the responder 101, determining suspect identification data from audio between the responder 101 and the driver 105 and/or the passenger 107); image processing of a live and/or recorded camera video feed (e.g. to detect the open can 127 and/or to determine whether the open can 127 is an alcoholic beverage (e.g. from a label, and the like) and/or to determine whether the object 129 is a weapon, or not).

As depicted, the incident context analyzer computing device 209 provides the jurisdiction 703, the incident type 705 and the person-of-interest score 709 (which may include, for example a respective person-of-interest score for each of the driver 105 and the passenger 107) to the evidence storage rules computing device 213.

Hence, as depicted, the controller 240 determines (e.g. at the block 304 of the method 300) the incident type 705 by receiving the incident type 705 from the incident context analyzer computing device 209.

Similarly, the controller 240 determines (e.g. at the block 404 of the method 400) the person-of-interest score 709 by receiving the person-of-interest score 709 from the incident context analyzer computing device 209.

Furthermore, receiving the incident type 705 and/or the person-of-interest score 709 (and/or the jurisdiction 703) from the incident context analyzer computing device 209 may occur upon demand by the controller 240 and/or periodically. For example, once the controller 240 has received the potential evidence 501, 502 with an associated incident identifier, the controller 240 may request one or more of the incident type 705 and/or the person-of-interest score 709 (and/or the jurisdiction 703) from the incident context analyzer computing device 209, which responsively retrieves the context data 707 from the one or more context source devices 205. Alternatively, the incident context analyzer computing device 209 may periodically request the context data 707 from the one or more context source devices 205 and determine the incident type 705 and/or the person-of-interest score 709 (and/or the jurisdiction 703) for transmission to the controller 240 periodically and/or upon request.

Either way, determining the incident type 705 of the particular incident may comprise retrieving, via the computer aided dispatch database 207 (e.g. stored at a computer aided dispatch computing device), the incident type 705 of the particular incident.

Similarly, determining the jurisdiction 703 of the particular incident may comprise retrieving, via the computer aided dispatch database 207 (e.g. stored at a computer aided dispatch computing device), the jurisdiction 703 of the particular incident. However, in some embodiments determination of the jurisdiction 703 may be optional, for example in embodiments where the system 200 is associated with a single jurisdiction.

Indeed, while as depicted the incident context analyzer computing device 209 is determining both the incident type 705 and the person-of-interest score 709, in some embodiments, the incident context analyzer computing device 209 may determine only the incident type 705 (e.g. when the method 300 is being executed at the evidence storage rules computing device 213) or only the person-of-interest score 709 (e.g. when the method 400 is being executed at the evidence storage rules computing device 213).

Figure 8:
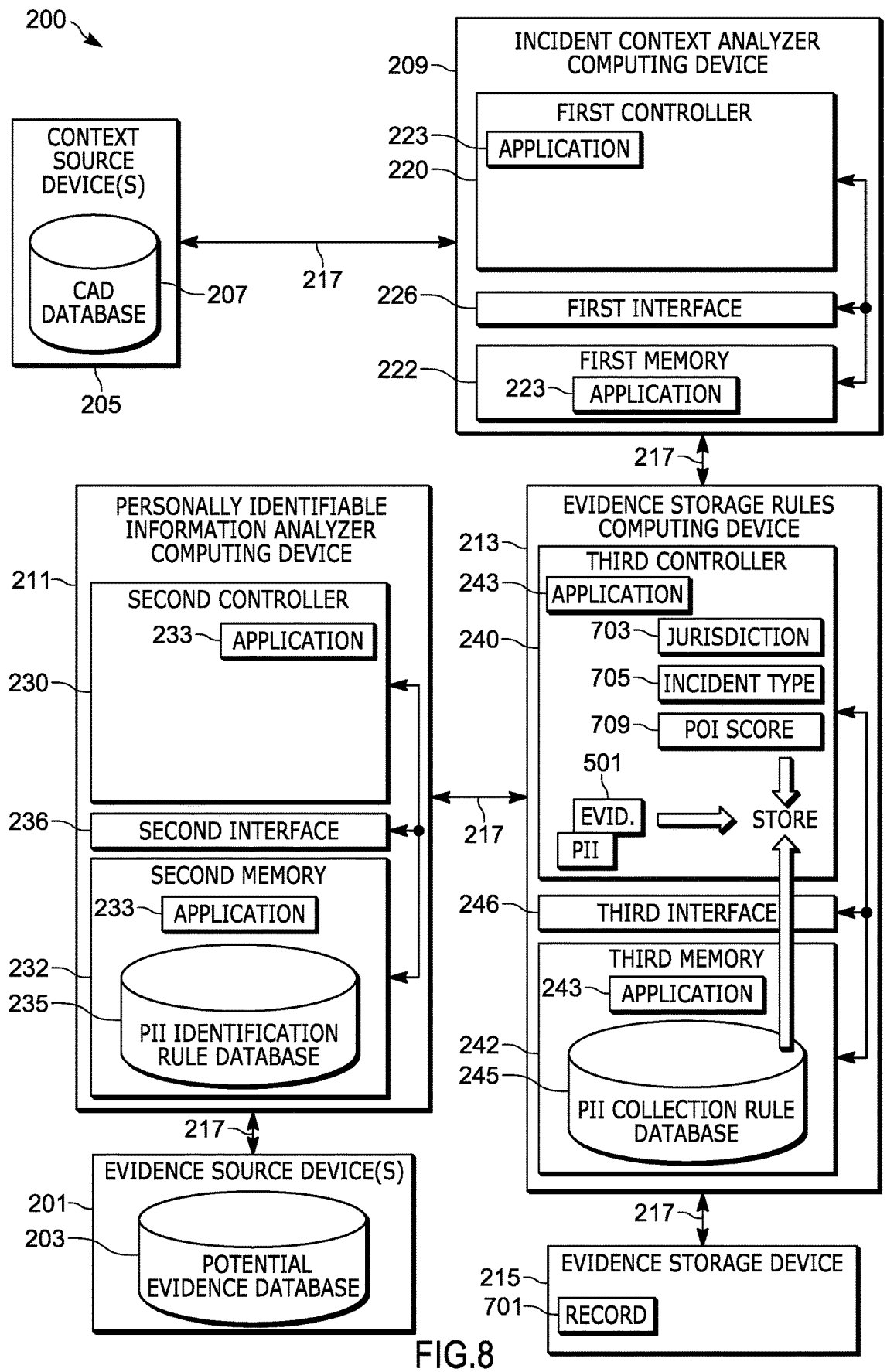
FIG. 8 depicts the computing device of the system of FIG. 2 determining that potential evidence that include personally identifiable information is to be stored in accordance with some embodiments.

Attention is next directed to FIG. 8, which is substantially similar to the FIG. 7, with like elements having like numbers. In particular, the FIG. 8 (in combination with FIG. 9, FIG. 10 and FIG. 11) depicts an example embodiment of the block 310 of the method 300 and the block 410 of the method 400.

For example, the controller 240 has determined the jurisdiction 703, the incident type 705 and the person-of-interest score 709 and is further accessing the PII collection rule database 245 to determine whether the potential evidence 501 (that has been determined to include personally identifiable information) is to be stored (e.g. at the block 312 of the method 300 and/or at the block 412 of the method 400) or discarded (e.g. at the block 314 of the method 300 and/or at the block 414 of the method 400).

For example, the jurisdiction 703 may be used as input to determine a set of rules to retrieve from the PII collection rule database 245 to determine whether the potential evidence 501 is to be stored or discarded, and which may also determine whether to use the incident type 705 and/or the person-of-interest score 709 to determine whether the potential evidence 501 (e.g. associated with the person for whom the person-of-interest score 709 was generated) is to be stored or discarded.

For example, attention is next directed to FIG. 9 which depicts an example of rules of the PII collection rule database 245 that are stored in the form of a mapping 945, for a first jurisdiction, that specifies, for each of a plurality of different incident types, varying types of personally identifiable information for collection (e.g. the "PII Evidence Type" column in the mapping 945). Put another way, the mapping 945 comprises an incident-type-to-personally-identifiable-information-type mapping.

In the depicted example, the mapping 945 is organized as a table, though the mapping 945 may be in any suitable format. The mapping 945 includes a classification of PII evidence type, one PII evidence type per row, with an associated action indicative of whether the associated PII evidence type is to be stored (e.g. at the block 312 of the method 300) or discarded (e.g. at the block 314 of the method 300). Furthermore, the mapping 945 is independent of the person-of-interest score 709.

For example, for each incident type, each PII evidence type is associated with a respective Boolean value indicative of whether the PII evidence type is to be stored (e.g. an associated Boolean value of "STORE") or discarded (e.g. an associated Boolean value of "DISCARD").

The mapping 945 may be populated based on laws and/or policies of the first jurisdiction with which the mapping 945 is associated, and updated as the laws and/or policies in the first jurisdiction change. Furthermore, the mapping 945 may be received from another jurisdiction and updated according to the laws and/or policies of the first jurisdiction As depicted, the PII evidence types in the mapping 945 correspond to the evidence types of the rules 635 that are classified as personally identifiable evidence, but may include any type of PII evidence. Furthermore, while five incident types are listed, the mapping 945 may include any number of incident types.

Furthermore, the incident types of the mapping 945 include a plurality of different incident types having relatively low to relatively high seventies. For example, the "Traffic Stop Minor" incident type is a relatively low severity, while the "Homicide" is a relatively high severity. Indeed, each incident type may be further associated with a severity rating and/or score to determine relative severity therebetween. Alternatively, the relative severity may be determined by an order of the incident type in the mapping 945 (e.g. as depicted).

Regardless, the plurality of different incident types having lower relative severity specify a relatively lower number of types of evidence containing personally identifiable information to store, and the plurality of different incident types having higher relative severity specify a relatively higher number of types of evidence containing personally identifiable information to store. For example, fewer of the PII evidence types are to be stored for the relatively low severity "Traffic Stop Minor" incident type than for the relatively high severity "Homicide" incident type.

Figure 10:
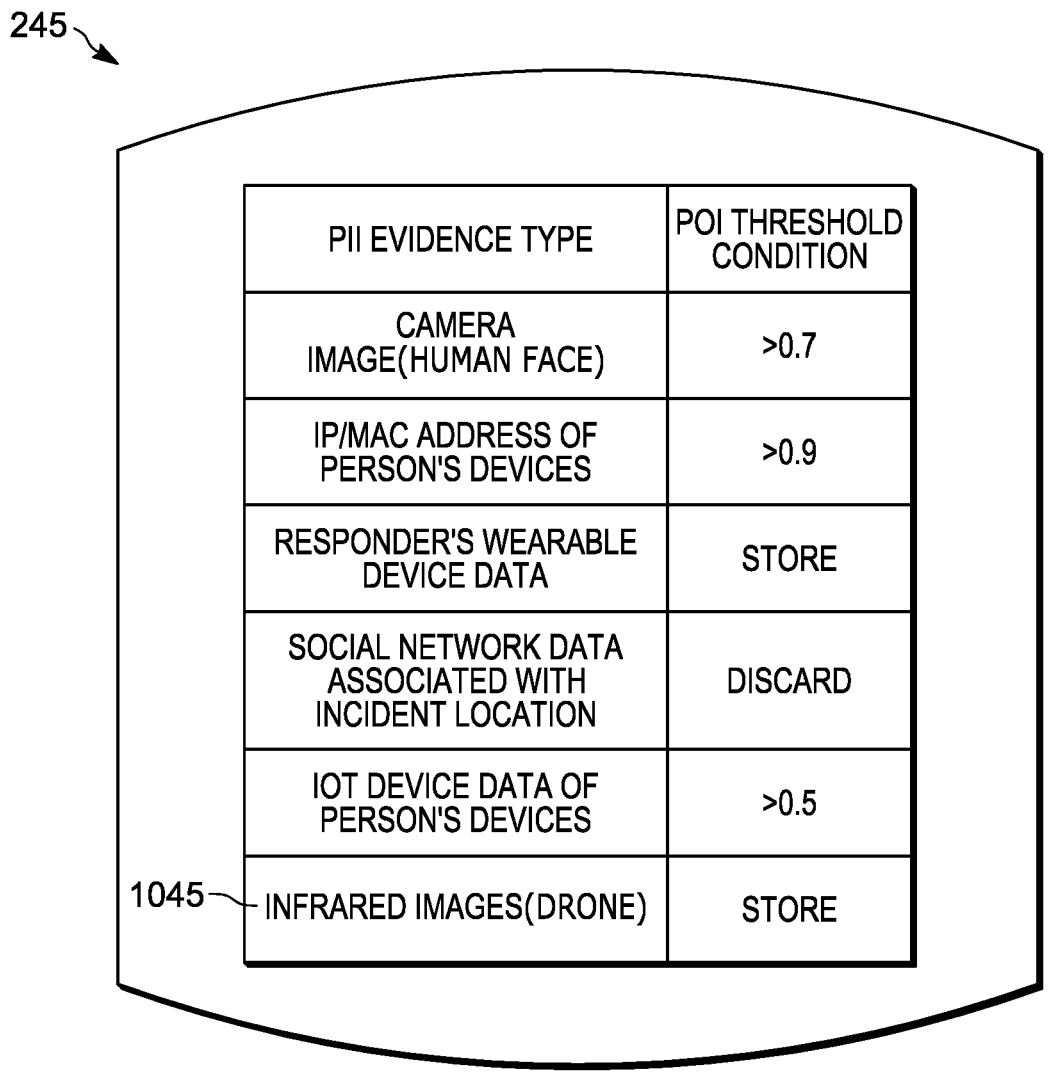
FIG. 10 depicts an example of a second mapping for assisting with determining whether personally identifiable information is to be stored according to a person-of-interest score in accordance with some embodiments.

Attention is next directed to FIG. 10 which depicts an example of rules of the PII collection rule database 245 that are stored in the form of a mapping 1045, for a second jurisdiction, that specifies, for each of a plurality of different person-of-interest threshold conditions, varying types of personally identifiable information for collection (e.g. the "PII Evidence Type" column in the mapping 1045). Put another way, the mapping 945 comprises a person-of-interest-threshold condition-to-personally-identifiable-information-type mapping.

In the depicted example, the mapping 1045 is organized as a table, though the mapping 1045 may be in any suitable format. The mapping 1045 includes a classification of PII evidence type, one PII evidence type per row, with an associated action indicative of whether the associated PII evidence type is to be stored (e.g. at the block 412 of the method 300) or discarded (e.g. at the block 414 of the method 300), depending on whether or not an associated person-of-interest score 709 meets the POI threshold condition. Furthermore, the mapping 1045 is independent of the incident type 705.

For example, each PII evidence type is associated with a person-of-interest threshold condition. When the person-of-interest score 709 meets the person-of-interest threshold condition, the associated PII evidence type is stored (e.g. assuming that the associated potential evidence 501 is associated with the person for whom the person-of-interest score 709 was generated); when the person-of-interest score 709 does not meet the person-of-interest threshold condition, the associated PII evidence type is discarded.

For example, for the PII evidence type of a camera image that includes a human face, when the person-of-interest score 709 is greater than 0.7, the associated potential evidence (e.g. the potential evidence 501) is stored. In other words, the threshold condition for the PII evidence type of a camera image that includes human face is the person-of-interest score 709 being greater than a threshold value of 0.7. Similarly, for the IP/MAC address evidence type, when the person-of-interest score 709 is greater than 0.9, the associated potential evidence (e.g. the potential evidence 501) is stored. In other words, the threshold condition for the IP/MAC address evidence type, is the person-of-interest score 709 being greater than a threshold value of 0.9. However, the mapping 1045 may include other types of threshold conditions and/or the threshold conditions may be specified other than person-of-interest score 709 being greater than a threshold value. For example, the threshold condition may be a threshold condition that is compatible with machine learning and/or deep learning based algorithms.

Furthermore, some of the threshold conditions, as depicted, may be to always "STORE" the associated potential evidence type (e.g. a responder's wearable device data) or to always "DISCARD" the associated potential evidence type (e.g. social network data).

Figure 11:
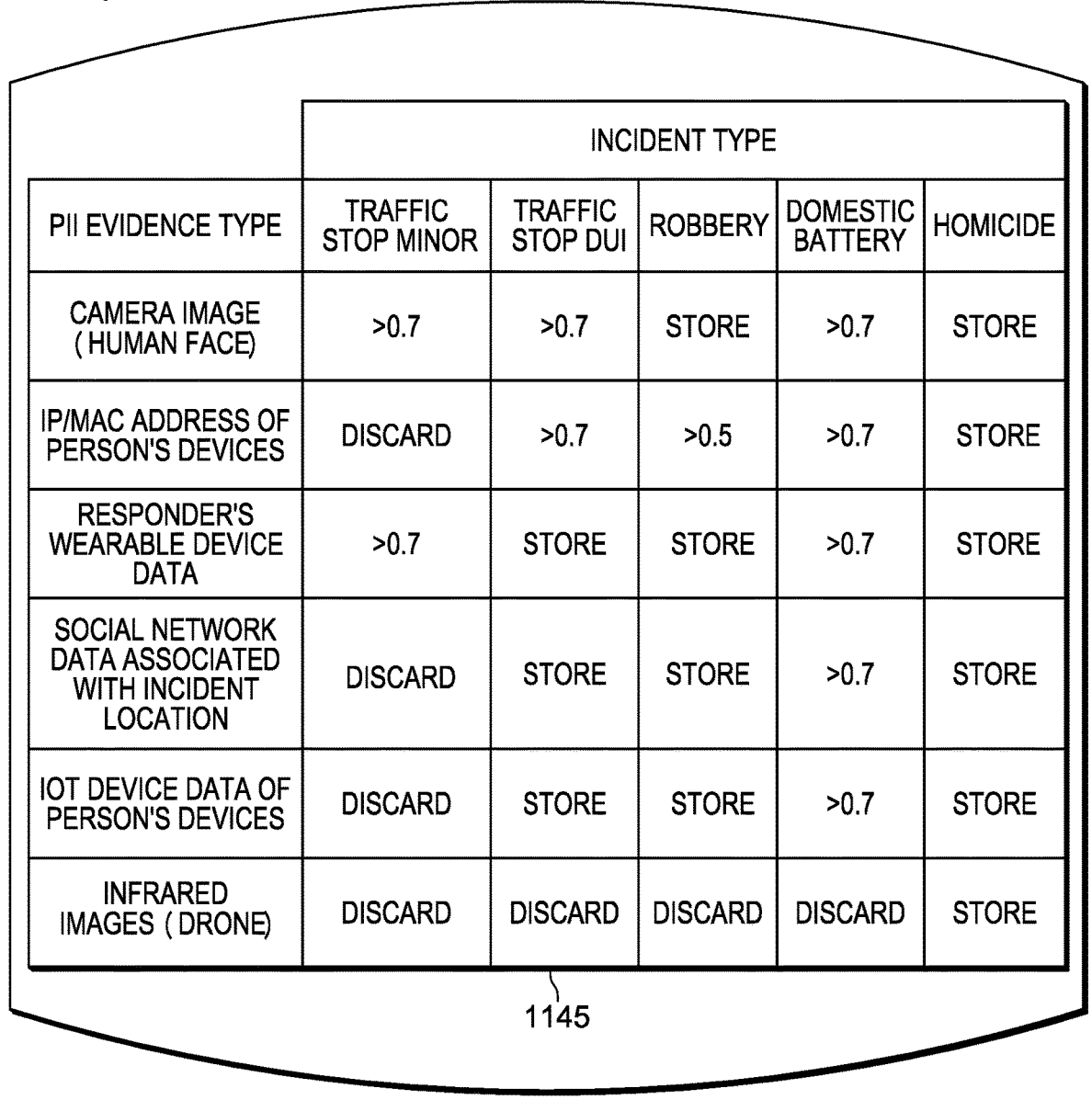
FIG. 11 depicts an example of a third mapping for assisting with determining whether personally identifiable information is to be stored according to both an incident type and a person-of-interest score in accordance with some embodiments.

Attention is next directed to FIG. 11 which depicts an example of rules of the PII collection rule database 245 that are stored in the form of a mapping 1145, for a third jurisdiction, that specifies, for each of a plurality of different incident types, varying types of personally identifiable information for collection (e.g. the "PII Evidence Type" column in the mapping 1145). Whether or not to store or discard a PII evidence type, for a given incident type, is further dependent on whether the person-of-interest score 709 meets an associated threshold condition.

In particular, the mapping 1145 includes respective person-of-interest threshold conditions for storing or discarding respective personally identifiable information for each of the plurality of different incident types and the varying types of personally identifiable information (e.g. of the potential evidence 501) that may be collected.

Hence, the depicted threshold conditions in the mapping 1145 are similar to those of the mapping 1045, but are dependent on an incident type. Put another way, the mapping 1145 represents a combination of the mapping 945 and the mapping 1045; for example, the mapping 1145 is similar to the mapping 945, but with each incident type column of the mapping 945 replaced with person-of-interest threshold conditions similar to the mapping 1045

Returning to FIG. 8, the controller 240 may select a mapping from the PII collection rule database 245 based on the jurisdiction 703. For example, when the jurisdiction 703 comprises an identifier of the first jurisdiction, the controller 240 retrieves the mapping 945; when the jurisdiction 703 comprises an identifier of the second jurisdiction, the controller 240 retrieves the mapping 1045; and when the jurisdiction 703 comprises an identifier of the third jurisdiction, the controller 240 retrieves the mapping 1145.

Furthermore, selection of a jurisdiction may indicate whether the controller 240 is implementing the method 300, the method 400 and/or a combination. For example, when the jurisdiction 703 comprises an identifier of the first jurisdiction, a determination of whether to store or discard the potential evidence 501 depends on the incident type 705 and not the person-of-interest score 709, and hence the method 300 is implemented. Similarly, when the jurisdiction 703 comprises an identifier of the second jurisdiction, a determination of whether to store or discard the potential evidence 501 depends on the person-of-interest score 709 and not the incident type 705, and hence the method 400 is implemented.

However, when the jurisdiction 703 comprises an identifier of the third jurisdiction, a determination of whether to store or discard the potential evidence 501 depends on both the incident type 705 and the person-of-interest score 709, and hence a combination of the method 300 and the method 400 is implemented; in other words, in these implementations, for the potential evidence to be stored, the controller 240 implements both the block 310 of the method 300 (e.g. to determine as a function of the incident type of the particular incident and an evidence type of the potential evidence 501, whether the potential evidence 501 should be stored or discarded) and the block 410 of the method 400 (e.g. to determine as a function of a person-of-interest score for each person of interest of the particular incident, and as function of the incident type, whether the potential evidence 501 should be stored or discarded, for example by comparing the person-of-interest score 709 with the respective person-of-interest threshold conditions).

As depicted in FIG. 8, the controller 240 has determined that the potential evidence 501 is to be stored. Hence, it is assumed that an evidence type of the potential evidence 501 has been used as input to one of the mappings 945, 1045, 1145, as well as one or more of the incident type 705 and the person-of-interest score 709.

Furthermore, while the decision to store or discard the potential evidence 501 has been described with respect to the use of the mappings 945, 1045, 1145, the decision to store or discard the potential evidence 501 may be performed using any combination of the mappings 945, 1045, 1145, and/or adaptive, dynamic, machine learning and/or deep learning algorithms.

Figure 12:
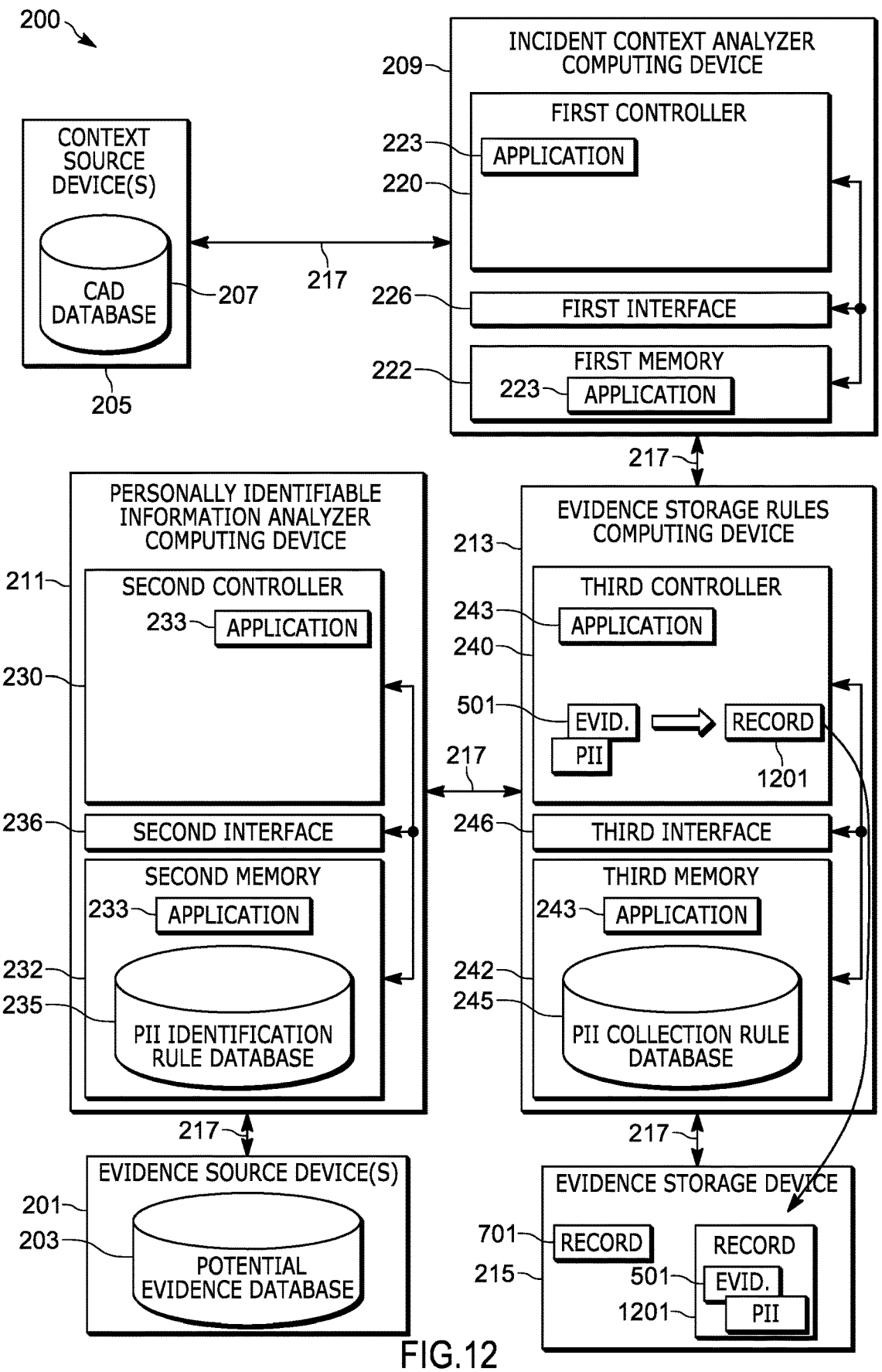
FIG. 12 depicts the computing device of the system of FIG. 2 generating a record of the potential evidence that include personally identifiable information in accordance with some embodiments.

Attention is next directed to FIG. 12 which is substantially similar to FIG. 8, with like elements having like numbers. As the controller 240 has determined that the potential evidence 501 is to be stored, the controller 240 generates (e.g. at the block 312 and/or at the block 412) a record 1201 (similar to the record 701) that includes the potential evidence 501 (e.g. that includes personally identifiable information) to be stored in the evidence storage device 215. As depicted, the controller 240 further transmits the potential evidence 502 (e.g. that includes personally identifiable information) for storage at the evidence storage device 215 in the record 1201.

The record 1201 may further include data received from the incident context analyzer computing device 209 including, but not limited to, the jurisdiction 703 and the incident type 705 of the particular associated incident, as well as an incident identifier, and the like.

In yet further embodiments, the generating the record 1201 of the potential evidence 501 may include altering the personally identifiable information according to a person-of-interest score associated with one or more persons associated with the personally identifiable information.

Figure 13:
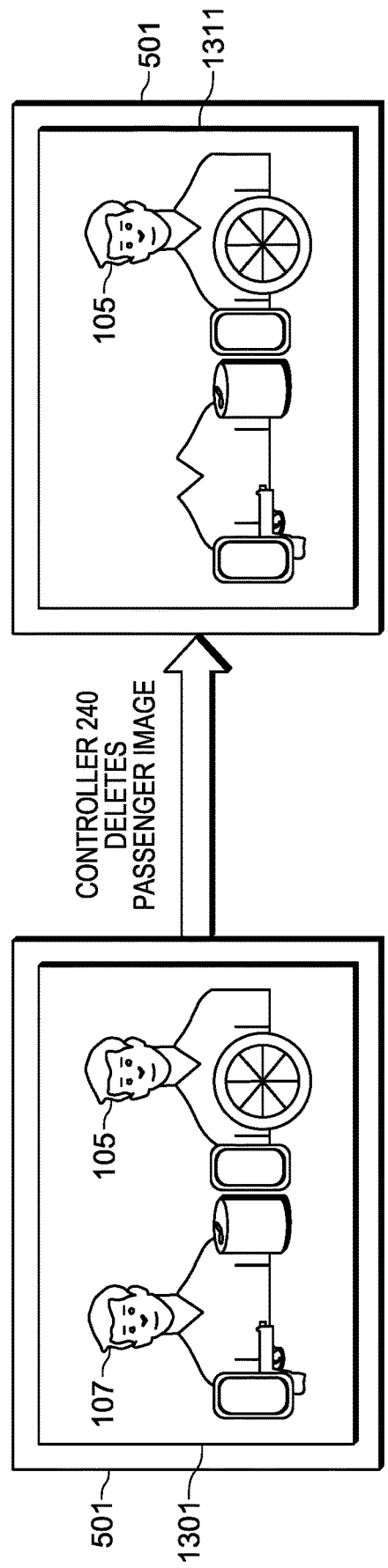
FIG. 13 depicts altering of the potential evidence that include personally identifiable information to be stored in accordance with some embodiments.

For example, attention is directed to FIG. 13 which depicts an example embodiment of the potential evidence 501, assuming that the potential evidence includes a camera image 1301 that includes the human face of the driver 105 and the passenger 107. Hence, the evidence type is a camera image that includes a human face. Assuming that the image 1301 is associated with both the driver 105 and the passenger 107, a person-of-interest score may be generated for both the driver 105 and the passenger 107 and compared to a threshold condition, for example for an incident type of "Traffic Stop Minor" of the mapping 1145. Assuming that the person-of-interest score for the driver 105 meets the threshold condition (e.g. of being greater than 0.7), but the person-of-interest score for the passenger 107 does not meet the threshold condition, the image 1301 is altered to produce an altered image 1311 in which the controller 240 deletes and/or pixelates and/or blurs the face of the passenger 107 prior to and/or during storing the image 1311 in the record 1201.

In yet further embodiments, the generating the record 1201 of the potential evidence 501 may include outputting the personally identifiable information to one or more notification devices.

Figure 14:
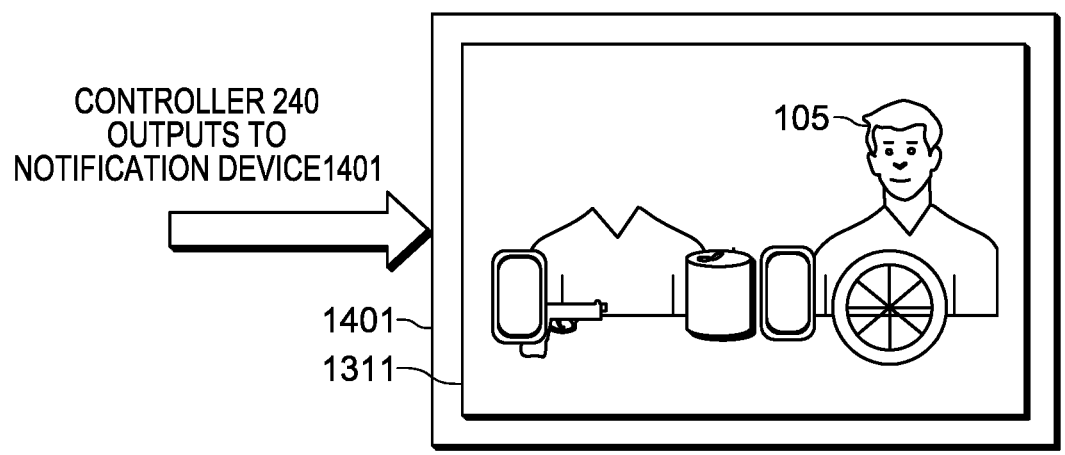
FIG. 14 depicts the potential evidence that include personally identifiable information being provided at a notification device in accordance with some embodiments.

For example, attention is directed to FIG. 14 which depicts an example embodiment of the controller 240 outputting the altered image 1311 (e.g. of the potential evidence 501) to a notification device 1401, which may include, but is not limited to, a display device of the evidence storage rules computing device 213 and/or a display device of the device 111 of the responder 101 and/or a display device of evidence storage device 215. However, when the potential evidence 501 comprises audio data, the notification device 1401 may include a speaker, and the like. Either way, the personally identifiable information of the potential evidence 501 may be manually checked at the notification device 1401.

Figure 15:
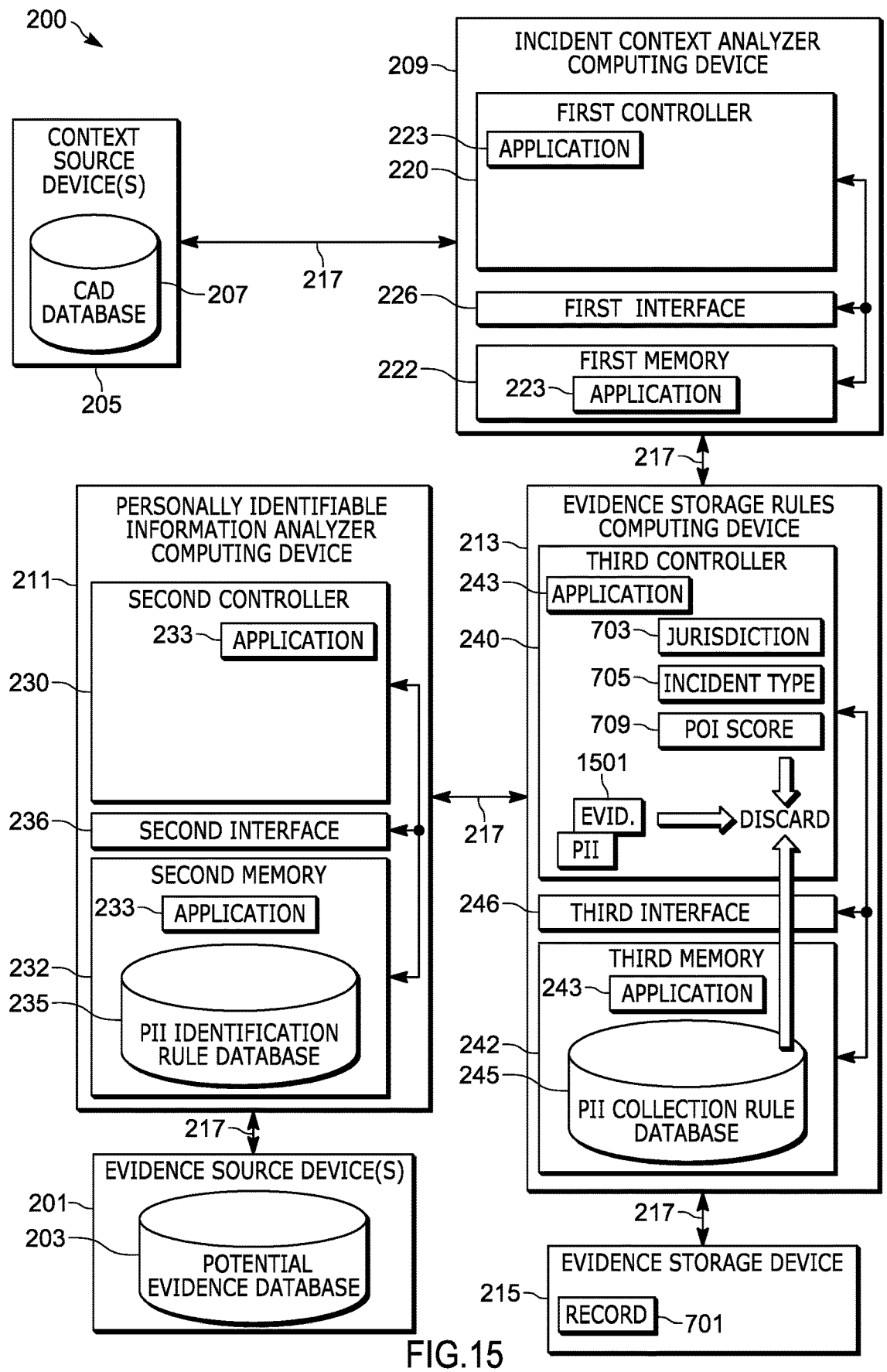
FIG. 15 depicts the computing device of the system of FIG. 2 determining that potential evidence that include personally identifiable information is to be discarded in accordance with some embodiments.

Attention is next directed to FIG. 15 which depicts another example embodiment of the block 310 of the method 300 and/or the block 410 of the method 400. In particular, the controller 240 has received more potential evidence 1501 that includes personally identifiable information, associated with the same particular incident as the potential evidence 501, 502. However, in contrast to the example in FIG. 8, in FIG. 15, the controller 240 determines that the potential evidence 1501 is to be discarded. As such, the controller 240 refrains from generating the record of the potential evidence 1501 that includes personally identifiable information and may cause the potential evidence 1501 to be discarded, for example by causing the potential evidence to be deleted from the one or more evidence source devices 201 (e.g. using suitable messaging and/or commands between the components of the system 200).

Alternatively, the potential evidence 1501 may not be deleted from the one or more evidence source devices 201, however, the potential evidence 1501 is not stored at the evidence storage device 215.

Figure 16:
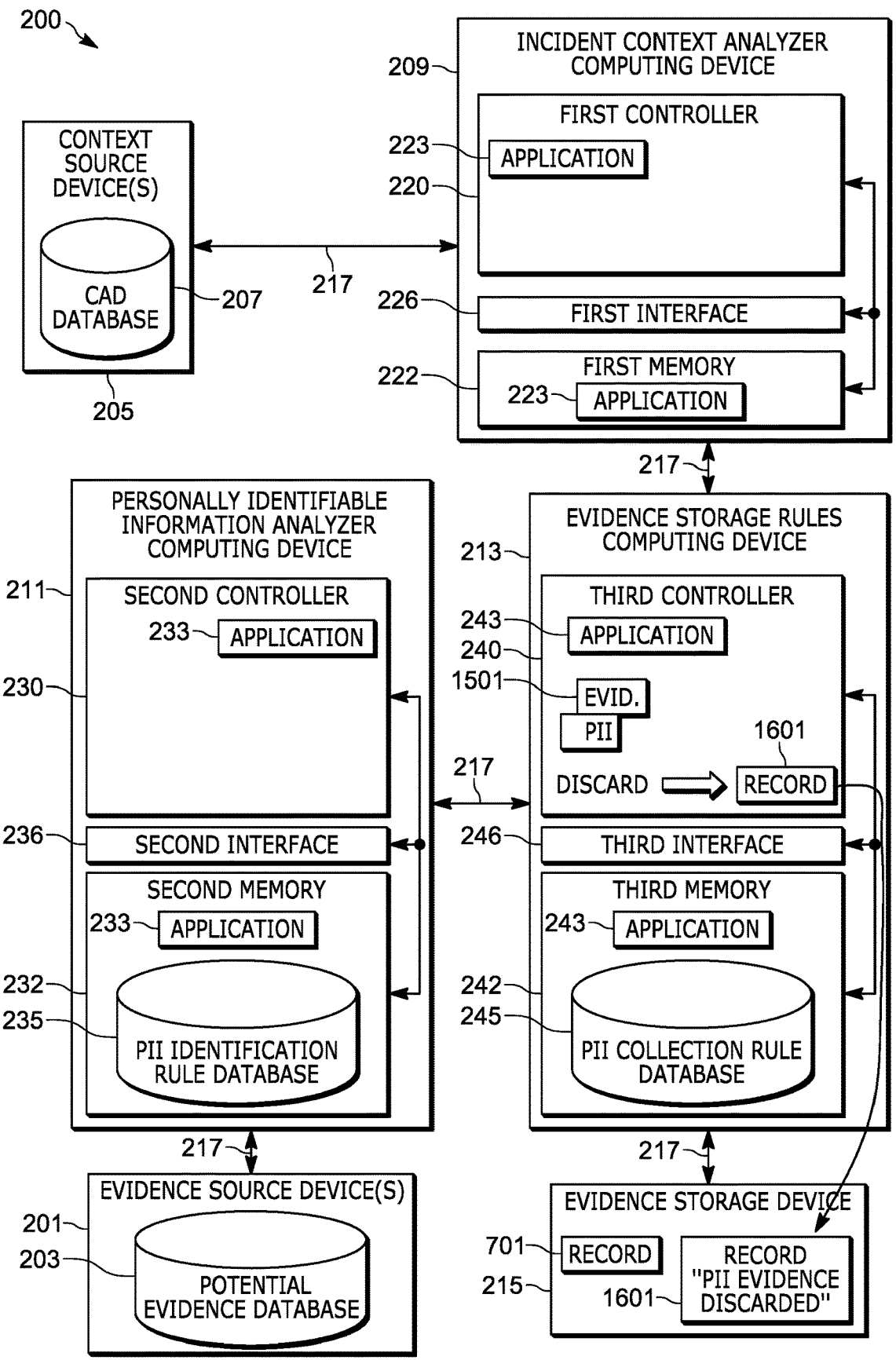
FIG. 16 depicts the computing device of the system of FIG. 2 generating a record of discarding potential evidence that include personally identifiable information in accordance with some embodiments.

Alternatively, as depicted in FIG. 16 (which is substantially similar to FIG. 15, with like elements having like numbers), the controller 240 may generate a record 1601 that is indicative of the refraining of the generating a record of the potential evidence 1501 and/or (as depicted) the discarding. Such a record 1601 may include an identifier of the potential evidence 1501 such that the potential evidence 1501 may be manually checked (e.g. at the potential evidence database 203) before being deleted. As depicted, the controller 240 further transmits an indication of the refraining (e.g. of the generating a record of the potential evidence 1501) to the evidence storage device 215 for storage.

Figure 17:
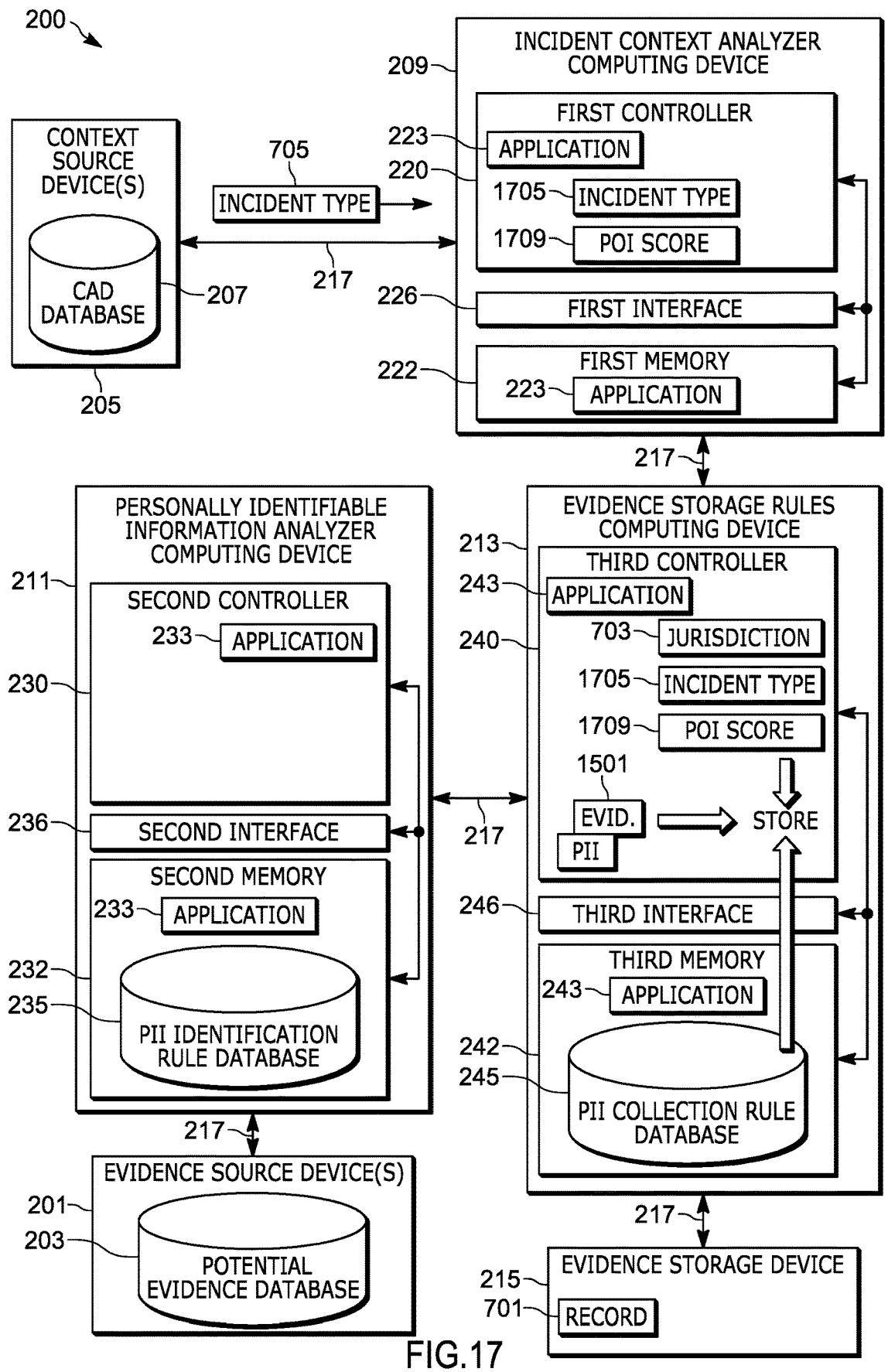
FIG. 17 depicts the computing device of the system of FIG. 2 updating a determination of whether potential evidence that include personally identifiable information is to be stored or discarded based on an updated incident type and/or an updated person-of-interest score in accordance with some embodiments.

Attention is next directed to FIG. 17, which is substantially similar to FIG. 15, with like elements having like numbers. However, in FIG. 17, the incident context analyzer computing device 209 is generating an updated incident type 1705. For example, the incident at the incident scene 100 may have initially been categorized as an incident type of "Traffic Stop Minor", but later updated to be a "Traffic Stop DUI", for example when the open can 127 was later determined to contain an alcoholic beverage. Similarly, the object 129 may have been determined to be a weapon associated with a homicide, and hence the incident at the incident scene 100 may have been updated to be associated with an incident type of a "Homicide". Either way, the incident type associated with the potential evidence 1501 has changed to the updated incident type 1705. As depicted, a person-of-interest score may have also changed to updated person-of-interest score 1709 (e.g. based on updated information about the incident). While not depicted, the jurisdiction may also be updated; for example an incident type of a "Traffic Stop Minor" may be under a city jurisdiction, while an incident type of a "Homicide" may be under a state and/or federal jurisdiction.

As such, the controller 240 again implements the method 300 and/or the method 400 to determine whether the potential evidence 1501, which was previously determined to be discarded, is to be stored or discarded (presuming the potential evidence 1501 is still stored in the potential evidence database 203). As depicted, the potential evidence 1501 is now determined to be "STORED" and hence a record, similar to the record 1201, is generated accordingly.

Indeed, the controller 240 may be further configured to determine an updated incident type of a particular incident. Responsive to the updated incident type of the particular incident being different from the incident type of the particular incident (e.g. as previously determined), the controller 240 one of: stores subsequently received potential evidence associated with the particular incident that would not have been stored based on the incident type; and refrains from storing subsequently received potential evidence associated with the particular incident that would have been stored based on the incident type. The subsequently received potential evidence may be the same potential evidence as previously received or new potential evidence.

A few scenarios are now described.

In one example scenario, during a minor traffic stop of a vehicle, a police officer's body-worn camera captures faces of a driver and passengers which are identified via facial recognition algorithms (which may be cloud based and accessed using a virtual assistant), for example using social media, crime records, and the like. A passenger used their device to live-stream a video of the officer/driver conversation to a social media website (which is associated with, and traceable to, the passenger). Wireless sensors at a device of the police officer pick-up WiFi and/or Bluetooth communication from passenger devices and/or wearables, which may include the MAC/IP addresses. All of this data may be identified as personally identifiable information as described above. Assuming the minor traffic stop is resolved as a minor incident (perhaps with a ticket issued), a video of the driver may be stored to the evidence storage device 215, as per department and/or regulatory policy and/or privacy laws as defined in the PII collection rule database 245. However, other incidentally collected evidence that includes personally identifiable information such as passengers faces, social media streams, wireless MAC addresses, are discarded and/or not stored.

In another example scenario, during what begins as a minor traffic stop, an open beer can is determined to be in the vehicle (e.g. either observed by the police officer, and which may be dictated to a virtual assistant at the device 111, or the open beer can is recognized by visual analytics performed on images from one of the cameras 113, 123, which may be reported to the officer's device 111 and/or the virtual assistant. Such visual analytics may be performed at the cameras 113, 123 and/or at the device 111 (assuming the device 111 receives the images from the cameras 113, 123). Because the incident type has now changed from a minor traffic stop to a potential DUI, one or more an incident type and person-of-interest score may have changed (as well as the jurisdiction, presuming that a minor traffic stop is considered a city offense, whereas a DUI may be a state offense), rules for storing personally identifiable information change, and the potential evidence is stored accordingly.

In another example scenario, police officers start checking out a robbery at a local store and, in the process, discover a body and/or blood on the floor. Such new context changes the incident type from a robbery to a homicide and triggers a change in evidence collection for personally identifiable information. For example, incidental personally identifiable information which may be discarded in a robbery context may now require storage due to the incident type changing from a robbery to a homicide.

Heretofore, the system 100 has been described with respect to determining whether potential evidence that includes personally identifiable information is to be stored or discarded as a function of the incident type of the particular incident and an evidence type of the potential evidence and/or based whether on a person-of-interest score meets one or more threshold conditions for an evidence type.

Put another way, in heretofore described example embodiments, the evidence storage rules computing device 213 and/or the controller 240 may determine whether potential evidence that includes personally identifiable information is to be processed according to a first personally identifiable information processing mode (e.g. for storing the potential evidence) or a second personally identifiable information processing mode (e.g. for discarding the potential evidence).

Figure 18:
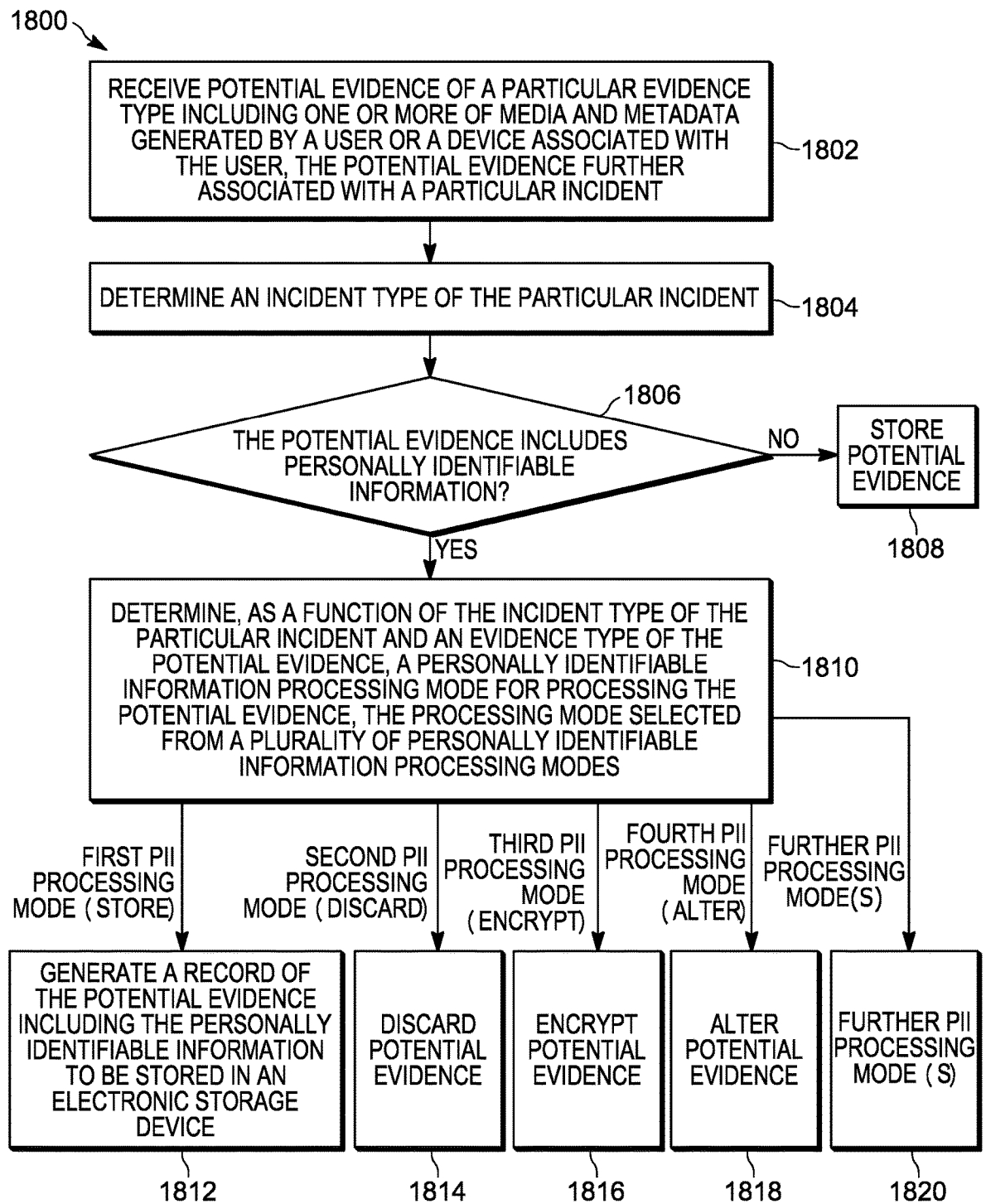
FIG. 18 is a flowchart of a method for screening of personally identifiable information according to incident type and evidence type in accordance with some alternative embodiments.

However, the evidence storage rules computing device 213 and/or the controller 240 may be configured to select from a plurality of personally identifiable information processing modes that may include actions other than storing or discarding including, but not limited to, altering the potential evidence (e.g. to remove personally identifiable information, as described with respect to FIG. 13 and FIG. 14), encrypting the potential evidence, combinations thereof, and the like For example, attention is now directed to FIG. 18 which depicts a flowchart representative of an alternative method 1800 for screening of personally identifiable information based on incident type. The operations of the method 1800 of FIG. 18 correspond to machine readable instructions that are executed by, for example, the evidence storage rules computing device 213, and specifically by the controller 240 of the evidence storage rules computing device 213. In the illustrated example, the instructions represented by the blocks of FIG. 18 are stored at the memory 242, for example, as the application 243. The method 1800 of FIG. 18 is one way in which the controller 240 and/or the evidence storage rules computing device 213 and/or the system 200 is configured. Furthermore, the following discussion of the method 1800 of FIG. 18 will lead to a further understanding of the evidence storage rules computing device 213 and/or the system 200, and their various components. However, it is to be understood that the evidence storage rules computing device 213 and/or the method 1800 and/or the system 200 may be varied, and need not work exactly as discussed herein in conjunction with each other, and that such variations are within the scope of present embodiments.

The method 1800 of FIG. 18 need not be performed in the exact sequence as shown and likewise various blocks may be performed in parallel rather than in sequence. Accordingly, the elements of method 1800 are referred to herein as "blocks" rather than "steps." The method 1800 of FIG. 18 may be implemented on variations of the evidence storage rules computing device 213 of FIG. 1, as well.

At a block 1802, the controller 240 receives potential evidence of a particular evidence type including one or more of media and metadata generated by a user or a device associated with the user, the potential evidence further associated with a particular incident. For example, the potential evidence may be received from the PII analyzer computing device 211.

At a block 1804, the controller 240 determines an incident type of the particular incident. For example, the incident type may be received from the incident context analyzer computing device 209.

At a block 1806, the controller 240 determines whether the potential evidence includes personally identifiable information, for example based on identification data and/or classification data receive from the PII analyzer computing device 211

When the potential evidence does not include personally identifiable information (e.g. a "NO" decision at the block 1806), at a block 1808, the controller 240 causes the potential evidence to be stored, for example by generating a record that includes the potential evidence and/or by transmitting the potential evidence to the evidence storage device 215 for storage in the record.

Heretofore, the method 1800 is similar to the method 300; however, in contrast to the method 300, when the potential evidence includes personally identifiable information (e.g. a "YES" decision at the block 1806), at a block 1810, the controller 240, responsive to determining that the potential evidence includes personally identifiable information, determines as a function of the incident type of the particular incident and an evidence type of the potential evidence, a personally identifiable information processing mode for processing the potential evidence, the processing mode selected from a plurality of personally identifiable information processing modes. Such a determination may be performed using the PII collection rule database 245.

For example, at the block 1810, the controller 240 may select from: a first personally identifiable information processing mode for storing the potential evidence; a second personally identifiable information processing mode for discarding the potential evidence; a third personally identifiable information processing mode for encrypting the potential evidence; a fourth personally identifiable information processing mode for altering the potential evidence; and further personally identifiable information processing modes, for example that may include combinations of the other personally identifiable information processing modes.

In particular, when the personally identifiable information processing mode that is selected at the block 1810 is a processing mode for storing the potential evidence, at a block 1812, the controller 240 generates a record of the potential evidence including the personally identifiable information to be stored in an electronic storage device, such as the evidence storage device 215.

Furthermore, when the personally identifiable information processing mode that is selected at the block 1810 is a processing mode for discarding the potential evidence, at a block 1814, the controller 240 discards the potential evidence and/or refrains from generating a record of the potential evidence.

Furthermore, when the personally identifiable information processing mode that is selected at the block 1810 is a processing mode for encrypting the potential evidence, at a block 1816, the controller 240 encrypts the potential evidence, for example using one or more cryptographic keys that may be stored at the memory 242 and/or in the application 243 and/or in the PII collection rule database 245. Such one or more cryptographic keys may include private or public encryption keys, and the like.

Furthermore, when the personally identifiable information processing mode that is selected at the block 1810 is a processing mode for altering the potential evidence, at a block 1818, the controller 240 alters the potential evidence.

However, the personally identifiable information processing mode may include further types of personally identifiable information processing modes that may be selected at the block 1810 which, when selected, may be executed by the controller 240 at a block 1820. Such further types of personally identifiable information processing modes may include, but are not limited to, combinations of the personally identifiable information processing modes. For example, a further personally identifiable information processing mode may include, but is not limited to, altering and/or encrypting the potential evidence prior to storing the potential evidence and the like. Indeed, yet a further personally identifiable information processing mode may include, but is not limited to, altering and/or encrypting the potential evidence prior to discarding the potential evidence and the like, for example as additional security for preventing access to the discarded potential evidence. Yet a further personally identifiable information processing mode may include transmitting the potential evidence to a given address for example a network address of a police and/or legal entity, and the like. However, other types of personally identifiable information processing modes are within the scope of the present specification.

Alternatively, and/or in addition to, selecting a personally identifiable information processing mode, from a plurality of personally identifiable information processing modes, as a function of incident type and evidence type, selecting a personally identifiable information processing mode, from a plurality of personally identifiable information processing modes, may occur as a function of personal interest score.

Figure 19:
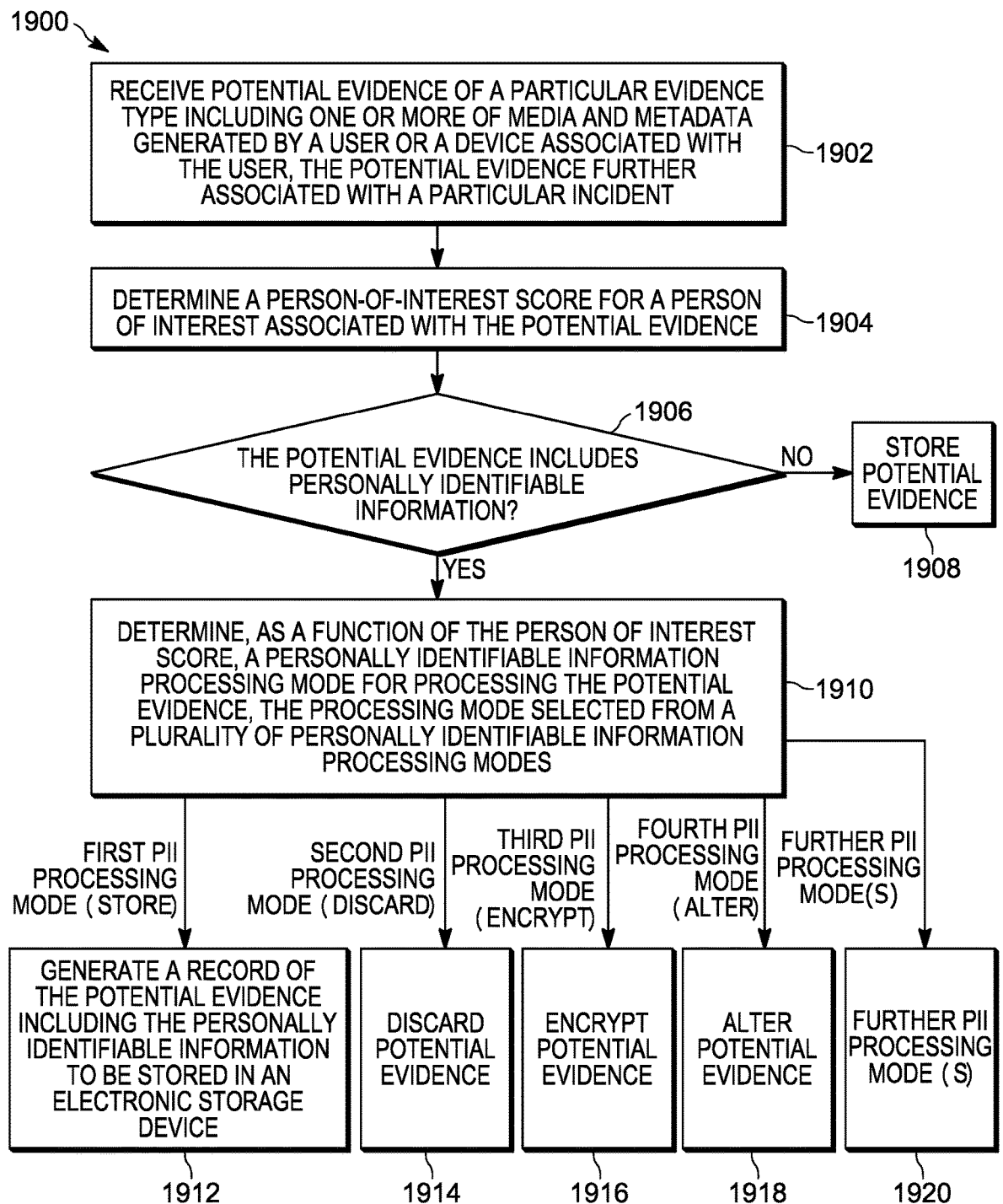
FIG. 19 is a flowchart of a method for screening of personally identifiable information according to a person-of-interest score in accordance with some alternative embodiments.

For example, attention is now directed to FIG. 19 which depicts a flowchart representative of an alternative method 1900 for screening of personally identifiable information based on person-of-interest scores. The operations of the method 1900 of FIG. 19 correspond to machine readable instructions that are executed by, for example, the evidence storage rules computing device 213, and specifically by the controller 240 of the evidence storage rules computing device 213. In the illustrated example, the instructions represented by the blocks of FIG. 19 are stored at the memory 242, for example, as the application 243. The method 1900 of FIG. 19 is one way in which the controller 240 and/or the evidence storage rules computing device 213 and/or the system 200 is configured. Furthermore, the following discussion of the method 1900 of FIG. 19 will lead to a further understanding of the evidence storage rules computing device 213 and/or the system 200, and their various components. However, it is to be understood that the evidence storage rules computing device 213 and/or the method 1900 and/or the system 200 may be varied, and need not work exactly as discussed herein in conjunction with each other, and that such variations are within the scope of present embodiments.

The method 1900 of FIG. 19 need not be performed in the exact sequence as shown and likewise various blocks may be performed in parallel rather than in sequence. Accordingly, the elements of method 1900 are referred to herein as "blocks" rather than "steps." The method 1900 of FIG. 19 may be implemented on variations of the evidence storage rules computing device 213 of FIG. 1, as well.

At a block 1902, the controller 240 receives potential evidence of a particular evidence type including one or more of media and metadata generated by a user or a device associated with the user, the potential evidence further associated with a particular incident. For example, the potential evidence may be received from the PII analyzer computing device 211. The block 1902 is generally similar to the block 302 of the method 300.

At a block 1904, the controller 240 determines a person-of-interest score for a person of interest associated with the potential evidence. For example, the person-of-interest score may be received from the incident context analyzer computing device 209. Furthermore, a person-of-interest score may be determined for each person associated with the potential evidence.

At a block 1906, the controller 240 determines whether the potential evidence includes personally identifiable information, for example based on identification data and/or classification data received from the PII analyzer computing device 211. The block 1906 is generally similar to the block 306 of the method 300.

When the potential evidence does not include personally identifiable information (e.g. a "NO" decision at the block 1906), at a block 1908, the controller 240 causes the potential evidence to be stored, for example by generating a record that includes the potential evidence and/or by transmitting the potential evidence to the evidence storage device 215 for storage in the record.

Heretofore, the method 1900 is similar to the method 400; however, in contrast to the method 400, when the potential evidence includes personally identifiable information (e.g. a "YES" decision at the block 1906), at a block 1910, the controller 240, responsive to determining that the potential evidence includes personally identifiable information, determines as a function of the personal interest score, a personally identifiable information processing mode for processing the potential evidence, the processing mode selected from a plurality of personally identifiable information processing modes. Such a determination may be performed using the PII collection rule database 245.

Furthermore, the plurality of personally identifiable information processing modes from which a personally identifiable information processing mode is selected may be similar to the personally identifiable information processing modes described above with respect to the method 1800.

Hence, for example, at the block 1910, the controller 240 may select from: a first personally identifiable information processing mode for storing the potential evidence; a second personally identifiable information processing mode for discarding the potential evidence; a third personally identifiable information processing mode for encrypting the potential evidence; a fourth personally identifiable information processing mode for altering the potential evidence; and further personally identifiable information processing modes, for example that may include combinations of the other personally identifiable information processing modes.

In particular, when the personally identifiable information processing mode that is selected at the block 1910 is a processing mode for storing the potential evidence, at a block 1912, the controller 240 generates a record of the potential evidence including the personally identifiable information to be stored in an electronic storage device, such as the evidence storage device 215.

Furthermore, when the personally identifiable information processing mode that is selected at the block 1910 is a processing mode for discarding the potential evidence, at a block 1914, the controller 240 discards the potential evidence and/or refrains from generating a record of the potential evidence.

Furthermore, when the personally identifiable information processing mode that is selected at the block 1910 is a processing mode for encrypting the potential evidence, at a block 1916, the controller 240 encrypts the potential evidence, for example using one or more cryptographic keys that may be stored at the memory 242 and/or in the application 243 and/or in the PII collection rule database 245. Such one or more cryptographic keys may include private or public cryptographic keys, and the like.

Furthermore, when the personally identifiable information processing mode that is selected at the block 1910 is a processing mode for altering the potential evidence, at a block 1918, the controller 240 alters the potential evidence.

However, the personally identifiable information processing mode may include further types of personally identifiable information processing modes that may be selected at the block 1910 which, when selected, may be executed by the controller 240 at a block 1920. Such further types of personally identifiable information processing modes may include, but are not limited to, combinations of the personally identifiable information processing modes. For example, a further personally identifiable information processing mode may include, but is not limited to, altering and/or encrypting the potential evidence prior to storing the potential evidence and the like. Indeed, yet a further personally identifiable information processing mode may include, but is not limited to, altering and/or encrypting the potential evidence prior to discarding the potential evidence and the like, for example as additional security for preventing access to the discarded potential evidence. Yet a further personally identifiable information processing mode may include transmitting the potential evidence to a given address for example a network address of a police and/or legal and/or analysis entity. However, other types of personally identifiable information processing modes are within the scope of the present specification.

Attention is next directed to FIG. 20 which depicts an example of alternative rules of the PII collection rule database 245 that are stored in the form of a mapping 2045, for a first jurisdiction, that specifies, for each of a plurality of different incident types, varying types of personally identifiable information for collection (e.g. the "PII Evidence Type" column in the mapping 2045). Put another way, the mapping 2045 comprises an incident-type-to-personally-identifiable-information-type mapping and is substantially similar to the mapping 945.

However, the mapping 2045 includes a classification of PII evidence type, one PII evidence type per row, with an associated personally identifiable information processing mode to be selected (e.g. at the block 1812 of the method 1800). Furthermore, the mapping 2045 is independent of the person-of-interest score 709.

For example, for each incident type, each PII evidence type is associated with a respective action to be executed when the associated personally identifiable information processing mode is selected. Such actions include storing (e.g. STORE) potential evidence, discarding ("DISCARD") potential evidence, encrypting ("ENCRYPT") potential evidence (e.g. prior to storing or discarding), altering ("ALTER") potential evidence (e.g. prior to storing or discarding) and transmitting ("TRANSMIT") the potential evidence, for example to a police and/or legal and/or analysis entity for further manual and/or automatic analysis. The altering may include deleting and/or removing personally identifiable information from the potential evidence, for example, as depicted, blurring and/or removing faces, similar to as described above with respect to FIG. 13 and FIG. 14. One or more addresses to which potential evidence is to be transmitted may be configured and/or pre-populated at the mapping 2045, depending on jurisdiction.

Figure 21:
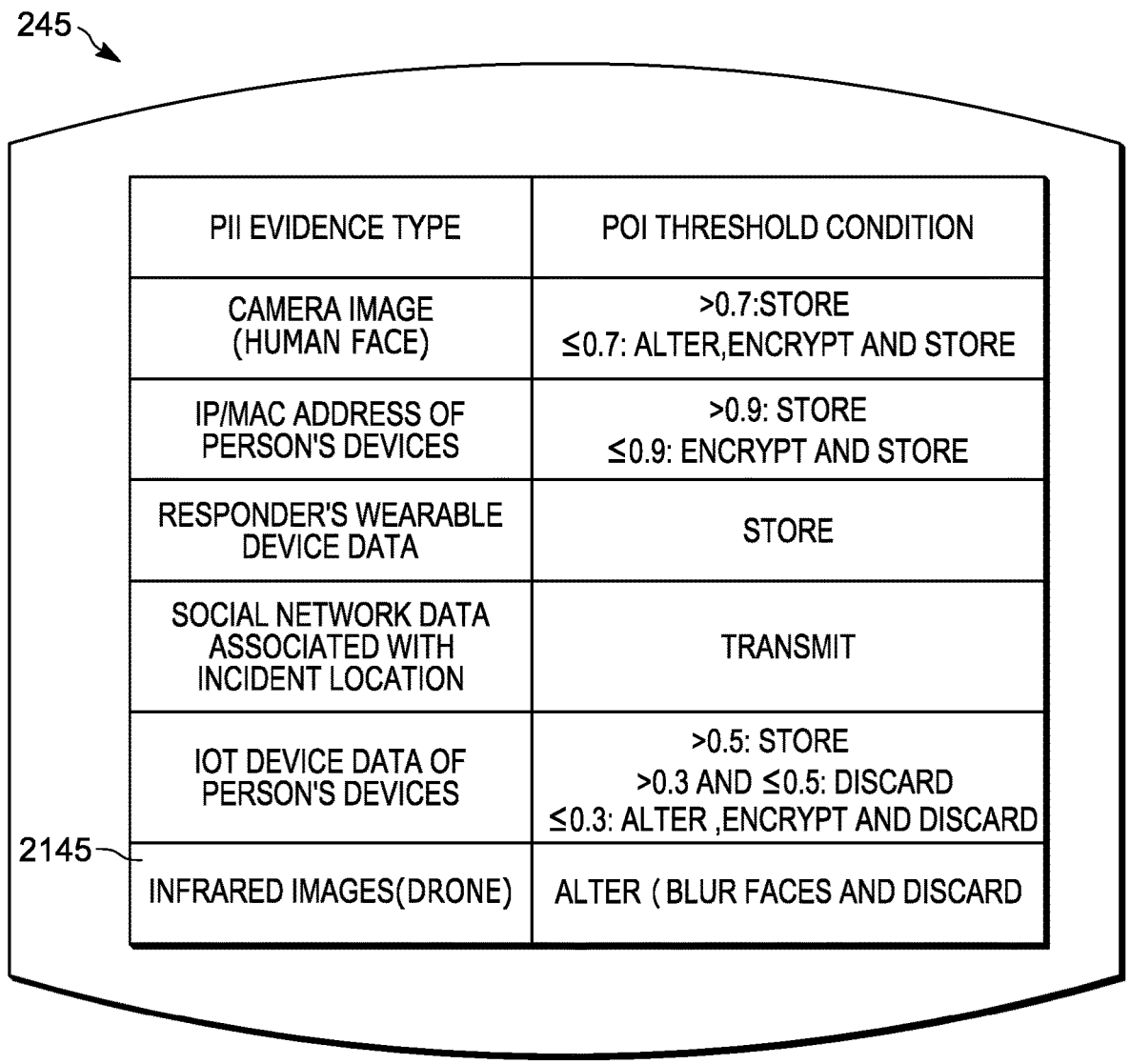
FIG. 21 depicts an example of a second mapping for assisting with selecting a personally identifiable information processing mode according to a person-of-interest score in accordance with some embodiments.

The mapping 2045 may be populated based on laws and/or policies of the first jurisdiction with which the mapping 2045 is associated, and updated as the laws and/or policies in the first jurisdiction change. Furthermore, the mapping 2045 may be received from another jurisdiction and updated according to the laws and/or policies of the first jurisdiction Attention is next directed to FIG. 21 which depicts an example of alternative rules of the PII collection rule database 245 that are stored in the form of a mapping 2145, for a second jurisdiction, that specifies, for each of a plurality of different person-of-interest threshold conditions, varying types of personally identifiable information for collection (e.g. the "PII Evidence Type" column in the mapping 2145). Put another way, the mapping 2045 comprises a person-of-interest-threshold condition-to-personally-identifiable-information-type mapping.

In the depicted example, the mapping 2145 is organized as a table, though the mapping 2145 may be in any suitable format. The mapping 2145 includes a classification of PII evidence type, one PII evidence type per row, with an associated action indicative of whether the associated PII evidence type is to be stored (e.g. at the block 412 of the method 300) or discarded (e.g. at the block 414 of the method 300), depending on whether or not an associated person-of-interest score 709 meets the POI threshold condition. Furthermore, the mapping 2145 is independent of the incident type 705 and is substantially similar to the mapping 1045.

However, the mapping 2145 includes a classification of PII evidence type, one PII evidence type per row, with an associated personally identifiable information processing mode to be selected (e.g. at the block 1912 of the method 1900).

For example, each PII evidence type is associated with a person-of-interest threshold condition. When the person-of-interest score 709 meets the person-of-interest threshold condition, an associated personally identifiable information processing mode is selected (e.g. assuming that the associated potential evidence is associated with the person for whom the person-of-interest score 709 was generated).

For example, for the PII evidence type of a camera image that includes a human face, when the person-of-interest score 709 is greater than 0.7, the associated potential evidence is stored; when the person-of-interest score 709 is less than or equal to 0.7, the associated potential evidence is altered to remove the personally identifiable information (e.g. the human face is blurred, deleted, and the like), encrypted and stored. As described above with respect to FIG. 13 and FIG. 14, such altering may occur on person-by-person basis, and/or an evidence-by-evidence basis, such that some human faces, and the like, with a person-of-interest score greater than 0.7 are not altered, while other human faces, and the like, with a person-of-interest score less than or equal to 0.7 are not altered.

Similarly, for the IP/MAC address evidence type, when the person-of-interest score 709 is greater than 0.9, the associated potential evidence is stored; when the person-of-interest score 709 is less than or equal to 0.9, the associated potential evidence is encrypted and stored.

Similarly, for the IoT device data evidence type, when the person-of-interest score 709 is greater than 0.5, the associated potential evidence is stored; when the person-of-interest score 709 is less than or equal to 0.5 and greater than 0.3, the associated potential evidence is discarded; and when the person-of-interest score 709 is less than or equal to 0.3, the associated potential evidence is altered (e.g. data in packets are altered), encrypted and discarded.

Similarly, for the infrared images (e.g. from a drone) evidence type, the associated potential evidence is altered to remove the personally identifiable information and stored (e.g. human faces are blurred, deleted, and the like).

Furthermore, some of the threshold conditions, as depicted, may be to always "STORE" the associated potential evidence type (e.g. a responder's wearable device data), always "DISCARD" the associated potential evidence type (e.g. IoT device data), or always "TRANSMIT" the associated potential evidence type (e.g. social network data).

Attention is next directed to FIG. 11 which depicts an example of alternative rules of the PII collection rule database 245 that are stored in the form of a mapping 2245, for a third jurisdiction, that specifies, for each of a plurality of different incident types, varying types of personally identifiable information for collection (e.g. the "PII Evidence Type" column in the mapping 2245). In the mapping 2245, selecting of a personally identifiable information processing mode, for a given incident type, is further dependent on the person-of-interest score 709, and is substantially similar to the mapping 1045.

In particular, the mapping 2245 includes respective person-of-interest threshold conditions for selecting a personally identifiable information processing mode, for each of the plurality of different incident types and the varying types of personally identifiable information that may be collected.

The depicted threshold conditions in the mapping 2245 are similar to those of the mapping 2145, but are dependent on an incident type. Put another way, the mapping 2245 represents a combination of the mapping 2045 and the mapping 2145; for example, the mapping 2245 is similar to the mapping 2045, but with each incident type column of the mapping 2045 replaced with person-of-interest threshold conditions similar to the mapping 2145.

Furthermore, in some embodiments, access to potential evidence that has been stored may be controller. Such access may be controlled via database access log-in and/or using encryption (e.g. when the potential evidence is encrypted). Hence, for example, storing may occur according a first access level, accessible using lower ranked credentials, and a second access level, accessible using higher ranked credentials (e.g. relative to the lower ranked credentials). A higher ranking policer officer may be issued with higher ranking credentials (which may include decryption keys) than a lower ranking police officer, and the higher ranking police officer may access more of the stored potential evidence than the lower ranking police officer.

Furthermore, such access may depend on a personally identifiable information processing mode used to process the potential evidence; hence, for example, the higher ranging credentials may be used to access potential evidence were a personally identifiable information processing mode for encryption was selected.

Described herein is a system, device and method for screening of personally identifiable information which depends on one or more of an incident type and person-of-interest scores to determine whether to store or discard potential evidence that includes personally identifiable information. The use of the system, device and method for screening of personally identifiable information may reduce usage of processing overhead and/or manpower overhead when determining whether to store or discard potential evidence that includes personally identifiable information.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . ." and "one or more . . ." language.

Moreover, in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device for collecting and storing evidence containing personally identifiable information, the device comprising:
   a controller and a communication interface, the controller having access to a memory storing a personally identifiable information rule collection database, the controller configured to:
   determine an incident type of a particular incident;
   determine whether potential evidence associated with the particular incident includes personally identifiable information, the potential evidence being of a particular evidence type including one or more of media and metadata generated by a user or a device associated with the user;
   responsive to determining that the potential evidence includes personally identifiable information:
   determine, using the personally identifiable information rule collection database, as a function of the incident type of the particular incident and an evidence type of the potential evidence, a personally identifiable information processing mode for processing the potential evidence, the personally identifiable information processing mode selected from a plurality of personally identifiable information processing modes; and
   when the personally identifiable information processing mode that is selected is a processing mode for storing the potential evidence, generate, at the controller, a record of the potential evidence including the personally identifiable information to be stored in an electronic storage device by: altering the personally identifiable information according to a person-or-interest score associated with one or more persons associated with the personally identifiable information.

2. A device for collecting and storing evidence containing personally identifiable information, the device comprising:
   a controller and a communication interface, the controller having access to a memory storing a personally identifiable information rule collection database, the controller configured to:
   determine an incident type of a particular incident;
   determine whether potential evidence associated with the particular incident includes personally identifiable information, the potential evidence being of a particular evidence type including one or more of media and metadata generated by a user or a device associated with the user;
   responsive to determining that the potential evidence includes personally identifiable information:
   determine, using the personally identifiable information rule collection database, as a function of the incident type of the particular incident and an evidence type of the potential evidence, whether the potential evidence should be stored or discarded; and
   when it is determined that the potential evidence is to be stored, generate, at the controller, a record of the potential evidence including the personally identifiable information to be stored in an electronic storage device by: altering the personally identifiable information according to a person-of-interest score associated with one or more persons associated with the personally identifiable information.

3. The device of claim 2, wherein the controller is further configured to generate the record of the potential evidence by one or more of:
transmitting, via the communication interface, the personally identifiable information to the electronic storage device for storage in the record; and
outputting the personally identifiable information to one or more notification devices.

4. The device of claim 2, wherein the controller is further configured to:
when it is determined that the potential evidence is not to be stored, refrain from generating the record of the potential evidence; and
one or more of:
generate another record indicative of refraining from generating the record of the potential evidence; and
transmit, via the communication interface, an indication of the refraining to the electronic storage device for storage.

5. The device of claim 2, wherein the controller is further configured to:
determine, as a function of the person-of-interest score for each person of interest of the particular incident, whether the potential evidence should be stored or discarded.

6. The device of claim 2, wherein the controller is further configured to determine the incident type of the particular incident by retrieving, via the communication interface and a computer aided dispatch database, the incident type of the particular incident.

7. The device of claim 2, wherein the controller is further configured to: access a mapping that specifies, for each of a plurality of different incident types, varying types of personally identifiable information for collection.

8. The device of claim 7, wherein the mapping comprises the plurality of different incident types having relatively low to relatively high severities, and wherein the plurality of different incident types having lower relative severity specify a relatively lower number of types of evidence containing personally identifiable information to store, and wherein the plurality of different incident types having higher relative severity specify a relatively higher number of types of evidence containing personally identifiable information to store.

9. The device of claim 7, wherein the mapping includes respective person-of-interest threshold conditions for storing or discarding respective personally identifiable information for each of the plurality of different incident types and the varying types of personally identifiable information that may be collected, and the controller is further configured to:
determine, as a function of the person-of-interest score, whether the potential evidence should be stored or discarded by comparing the person-of-interest score with the respective person-of-interest threshold conditions.

10. The device of claim 2, wherein the controller is further configured to:
determine an updated incident type of the particular incident; and,
responsive to the updated incident type of the particular incident being different from the incident type of the particular incident, one of:
store subsequently received potential evidence associated with the particular incident that would not have been stored based on the incident type; and
refrain from storing subsequently received potential evidence associated with the particular incident that would have been stored based on the incident type.

11. The device of claim 2, wherein the electronic storage device is associated with the particular incident.

12. A method for collecting and storing evidence containing personally identifiable information, the method comprising:
determining, at a controller of an evidence storage rules computing device, an incident type of a particular incident;
determining, at the controller, whether potential evidence associated with the particular incident includes personally identifiable information, the potential evidence being of a particular evidence type including one or more of media and metadata generated by a user or a device associated with the user;
responsive to determining that the potential evidence includes personally identifiable information:
determining, at the controller, as a function of the incident type of the particular incident and an evidence type of the potential evidence, whether the potential evidence should be stored or discarded; and
when it is determined that the potential evidence is to be stored, generating, at the controller, a record of the potential evidence including the personally identifiable information to be stored in an electronic storage device by: altering the personally identifiable information according to a person-of-interest score associated with one or more persons associated with the personally identifiable information.

13. The method of claim 12, wherein the generating the record of the potential evidence includes one or more of:
transmitting the personally identifiable information to the electronic storage device for storage in the record; and
outputting the personally identifiable information to one or more notification devices.

14. The method of claim 12, further comprising:
when it is determined that the potential evidence is not to be stored, refraining from generating the record of the potential evidence; and
one or more of:
generating another record indicative of the refraining; and
transmitting an indication of the refraining to the electronic storage device for storage.

15. The method of claim 12, further comprising:
determining, at the controller, as a function of the person-of-interest score for each person of interest of the particular incident, whether the potential evidence should be stored or discarded.

16. The method of claim 12, wherein determining the incident type of the particular incident comprises retrieving, via a computer aided dispatch database, the incident type of the particular incident.

17. The method of claim 12, further comprising: accessing a mapping that specifies, for each of a plurality of different incident types, varying types of personally identifiable information for collection.

18. The method of claim 17, wherein the mapping comprises the plurality of different incident types having relatively low to relatively high severities, and wherein the plurality of different incident types having lower relative severity specify a relatively lower number of types of evidence containing personally identifiable information to store, and wherein the plurality of different incident types having higher relative severity specify a relatively higher number of types of evidence containing personally identifiable information to store.

19. The method of claim 17, wherein the mapping includes respective person-of-interest threshold conditions for storing or discarding respective personally identifiable information for each of the plurality of different incident types and the varying types of personally identifiable information that may be collected, the method further comprising:

determining, at the controller, as a function of the person-of-interest score, whether the potential evidence should be stored or discarded by comparing the person-of-interest score with the respective person-of-interest threshold conditions.

20. The method of claim 12, further comprising:

determining, at the controller, an updated incident type of the particular incident; and, responsive to the updated incident type of the particular incident being different from the incident type of the particular incident, one of:

storing subsequently received potential evidence associated with the particular incident that would not have been stored based on the incident type; and refraining from storing subsequently received potential evidence associated with the particular incident that would have been stored based on the incident type.

\* \* \* \* \*